United States Patent
Lauzon

(10) Patent No.: US 11,685,214 B2
(45) Date of Patent: Jun. 27, 2023

(54) GAS SPRING AND DAMPER ASSEMBLIES AS WELL AS SUSPENSION SYSTEMS INCLUDING SAME

(71) Applicant: Firestone Industrial Products Company, LLC, Nashville, TN (US)

(72) Inventor: Peter W. Lauzon, Hermitage, TN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 0 days.

(21) Appl. No.: 17/790,466

(22) PCT Filed: Dec. 23, 2020

(86) PCT No.: PCT/US2020/066752
§ 371 (c)(1),
(2) Date: Jun. 30, 2022

(87) PCT Pub. No.: WO2021/138173
PCT Pub. Date: Jul. 8, 2021

(65) Prior Publication Data
US 2023/0040608 A1 Feb. 9, 2023

Related U.S. Application Data

(60) Provisional application No. 62/956,118, filed on Dec. 31, 2019.

(51) Int. Cl.
*B60G 15/12* (2006.01)
*F16F 9/08* (2006.01)
(Continued)

(52) U.S. Cl.
CPC .............. *B60G 15/12* (2013.01); *F16F 9/084* (2013.01); *F16F 9/54* (2013.01);
(Continued)

(58) Field of Classification Search
CPC .............. B60G 15/12; B60G 2202/314; B60G 2204/1262; B60G 2206/424; F16F 9/084; F16F 9/54; F16F 2224/025; F16F 2236/08
See application file for complete search history.

(56) References Cited

U.S. PATENT DOCUMENTS 3,046,003 A * 7/1962 Schultz .................. B60G 15/12
267/64.24
4,555,096 A * 11/1985 Pryor ...................... F16F 9/084
267/64.21
(Continued)

FOREIGN PATENT DOCUMENTS

| DE | 102011086415 A1 | 8/2012 |
|---|---|---|
| DE | 102017211139 A1 | 3/2018 |
| EP | 1589253 A1 | 10/2005 |

OTHER PUBLICATIONS

International Search Report and Written Opinion dated Apr. 15, 2021 issued by EPO in connection with corresponding International Application No. PCT/US2020/066752.

*Primary Examiner* — Robert A. Siconolfi
*Assistant Examiner* — James K Hsiao
(74) *Attorney, Agent, or Firm* — Thomas R. Kingsbury; Matthew P. Dugan

(57) ABSTRACT

End members are supportable along a damper housing and dimensioned for securement to a flexible spring member. The end members include a wall with a first wall portion having an outer surface portion dimensioned to receivingly engage the flexible spring member. A second wall portion includes an inner surface portion dimensioned to receivingly engage a torsional isolator supported on the damper housing. A third wall portion extends radially outward beyond the second wall portion and includes a passage surface at least partially defining a passage extending axially through the (Continued)

third wall portion. The passage is dimensioned to receive a projection of the torsional isolator. End member assemblies including such an end member as well as gas spring and damper assemblies and suspension systems are also included.

20 Claims, 19 Drawing Sheets

(51) Int. Cl.
    *F16F 9/54*     (2006.01)
    *F16F 9/084*     (2006.01)

(52) U.S. Cl.
    CPC ............. *B60G 2202/314* (2013.01); *B60G 2204/1262* (2013.01); *B60G 2206/424* (2013.01); *F16F 2224/025* (2013.01); *F16F 2236/08* (2013.01)

(56) References Cited

U.S. PATENT DOCUMENTS

| | | | | |
|---|---|---|---|---|
| 4,771,994 A * | 9/1988 | Makita | ............... | B60G 15/14 267/64.21 |
| 5,636,831 A * | 6/1997 | Gubitz | ............... | F16F 13/20 267/64.27 |
| 5,649,692 A * | 7/1997 | Gilsdorf | ............ | B60G 11/26 267/64.22 |
| 6,199,844 B1 * | 3/2001 | McCormick | ....... | B60G 21/0551 267/221 |
| 6,286,820 B1 * | 9/2001 | Raulf | ................ | F16F 9/05 267/64.24 |
| 6,454,248 B2 * | 9/2002 | Pradel | ............... | F16F 9/512 267/64.11 |
| 7,068,806 B2 * | 6/2006 | Walsh | ................ | H04R 9/06 381/345 |
| 7,175,165 B1 * | 2/2007 | Vande Brake | ....... | F16F 9/0463 267/64.27 |
| 7,959,135 B2 * | 6/2011 | Voelkel | ............. | F16F 9/05 267/64.21 |
| 8,172,237 B2 * | 5/2012 | Peterson | ............ | B60G 17/0155 280/124.157 |
| 9,004,470 B2 * | 4/2015 | Fleniken | ........... | F16F 9/58 267/220 |
| 11,548,343 B2 * | 1/2023 | Fischbach | .......... | F16F 9/54 |
| 2002/0189441 A1 * | 12/2002 | Collis | .............. | F16F 9/38 92/165 R |
| 2003/0234147 A1 * | 12/2003 | Lun | ................ | F16F 9/58 188/321.11 |
| 2005/0236748 A1 * | 10/2005 | Gross | .............. | F16F 9/057 267/64.27 |
| 2015/0191066 A1 * | 7/2015 | Kantor | ............. | F16F 9/084 267/64.24 |
| 2017/0204928 A1 * | 7/2017 | Dehlwes | ........... | F16F 9/0454 |
| 2017/0284493 A1 * | 10/2017 | Smith | .............. | F16F 9/05 |
| 2018/0009283 A1 * | 1/2018 | Pniewski | ........... | F16F 9/3271 |

* cited by examiner

GAS SPRING AND DAMPER ASSEMBLIES AS WELL AS SUSPENSION SYSTEMS INCLUDING SAME

This application is the National Stage of International Application No. PCT/US2020/066752, filed on Dec. 23, 2020, which claims the benefit of priority from U.S. Provisional Patent Application No. 62/956,118, filed on Dec. 31, 2019, the entire contents of which is hereby incorporated herein by reference.

BACKGROUND

The subject matter of the present disclosure broadly relates to the art of gas spring devices and, more particularly, to end members for gas spring and damper assemblies that are dimensioned to operably engage torsional isolators as well as end member assemblies including one or more of such torsional isolators. Gas spring and damper assemblies including one or more of such end members and suspension systems including one or more of such gas spring and damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring elements function to accommodate forces and loads associated with the operation and use of the vehicle. The plurality of damping devices are operative to dissipate energy associated with undesired inputs and movements of the sprung mass, such as road inputs occurring under dynamic operation of a vehicle, for example. Typically, such dampers are liquid filled and operatively connected between a sprung mass and an unsprung mass, such as between a body and an axle of a vehicle, for example. One example of such damping components are conventional shock absorbers that are commonly used in vehicle suspension systems.

Suspension systems of a wide variety of types and kinds are generally well known and permit relative movement between the sprung and unsprung masses of a vehicle. In some cases, such relative movement may impart a relative rotation to the opposing end members of a gas spring of the suspension system. Such condition often occurs in gas spring and damper assemblies in which a pressurized gas spring is assembled outwardly along an otherwise conventional damper. Such relative rotation is generally deemed undesirable as the same can induce a twist in the flexible wall of the gas spring assembly, which can lead to performance degradation and/or other issues.

Various designs have been developed in an effort to eliminate or otherwise address such rotation-induced twisting of the gas spring components. As one example, the upper end member of the gas spring can be secured on the sprung mass of a vehicle in a manner capable of permitting rotation rather than by rigidly securing the upper end member to the unsprung mass of the vehicle. As another example, the lower end member of the gas spring can be rotatably supported on the housing of the damper, such as by using a friction-reducing bearing, for example. In known designs, however, the configuration of the bearing element that supports the lower end member on the damper housing and the corresponding sealing arrangement can, in some cases, permit lateral movement of the second end member relative to the damper housing to undesirably occur. Attempts to minimize or at least decrease the magnitude and/or influence of such lateral movements have resulted in end member constructions having decreased manufacturability, increased assembly time and/or costs, and/or other disadvantages.

Notwithstanding the overall success of known constructions, the foregoing and/or other disadvantages may still exist that could be limiting to broader adoption and/or use of gas spring and damper assemblies in connection with vehicular and/or other applications. Accordingly, it is believed desirable to develop constructions that may aid in overcoming the foregoing and/or other problems and/or disadvantages of known designs, and/or otherwise advance the art of vehicle suspension systems and/or components thereof.

BRIEF DESCRIPTION

One example of an end member in accordance with the subject matter of the present disclosure can be supportable along an associated damper housing and dimensioned for securement to an associated flexible spring member. The end member can have a longitudinal axis and can include a wall extending peripherally about the longitudinal axis and longitudinally between a first end and a second end opposite the first end. The wall can include a first wall portion disposed along the first end with an outer surface portion dimensioned to receivingly engage the associated flexible spring member. A second wall portion can be disposed along the second end in longitudinally-spaced relation to the first wall portion. The second wall portion can include an inner surface portion dimensioned to receivingly engage an associated torsional isolator supported on the associated damper housing. A third wall portion can be disposed along an opposing side of the second wall portion from the first wall portion. The third wall portion can extend radially outward beyond the second wall portion and can include a passage surface at least partially defining a passage extending axially through the third wall portion in offset relation to the longitudinal axis with the passage dimensioned to at least partially receive an associated projection of the associated torsional isolator.

One example of an end member assembly in accordance with the subject matter of the present disclosure can include an end member according to the foregoing paragraph with the end member at least partially formed from a first material. In some cases, the end member assembly can include a backing ring that is separate from the end member and disposed along the first wall portion radially inward of the outer surface portion. If included, the backing ring can have a backing ring wall formed from a second material that is different from the first material of end member. Additionally, or in the alternative, the end member assembly can include an end member shell secured along an exterior surface of the end member. The end member shell can include a shell wall having an outer surface along which the associated flexible spring member can at least partially form an associated rolling lobe. Furthermore, or as another alternative, the end member assembly can include a torsional isolator supportable along the associated damper housing. If included, the torsional isolator can include a first rigid body securable along the associated damper housing in rotationally-fixed relation thereto. A second rigid body can be operatively engaged in rotationally-fixed relation with the end member at least along the third wall portion thereof. And, a compliant body can be operatively connected between the first and second rigid bodies.

One example of a gas spring and damper assembly in accordance with the subject matter of the present disclosure can include a damper assembly having a longitudinally-extending axis and a gas spring assembly disposed in axially coextensive relation with at least a portion of the damper assembly. The damper assembly can include a damper housing with a housing wall extending axially between opposing first and second ends. The housing wall can at least partially define a damping chamber containing a quantity of damping fluid. A damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially-outwardly from the first end of the damper housing. The gas spring assembly can include a flexible spring member extending peripherally about the longitudinal axis and longitudinally between opposing first and second ends such that a spring chamber is at least partially defined therebetween. A first end member can be operatively connected to the elongated damper rod and operatively secured across the first end of the flexible spring member such that a substantially fluid-tight connection is formed therebetween. An end member or an end member assembly according either one of the foregoing two paragraphs can be supported on the damper housing and operatively secured across the second end of the flexible spring member such that a substantially fluid-tight connection is formed therebetween.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or elements may be exaggerated for purposes of clarity and/or ease of understanding.

Figure 1:
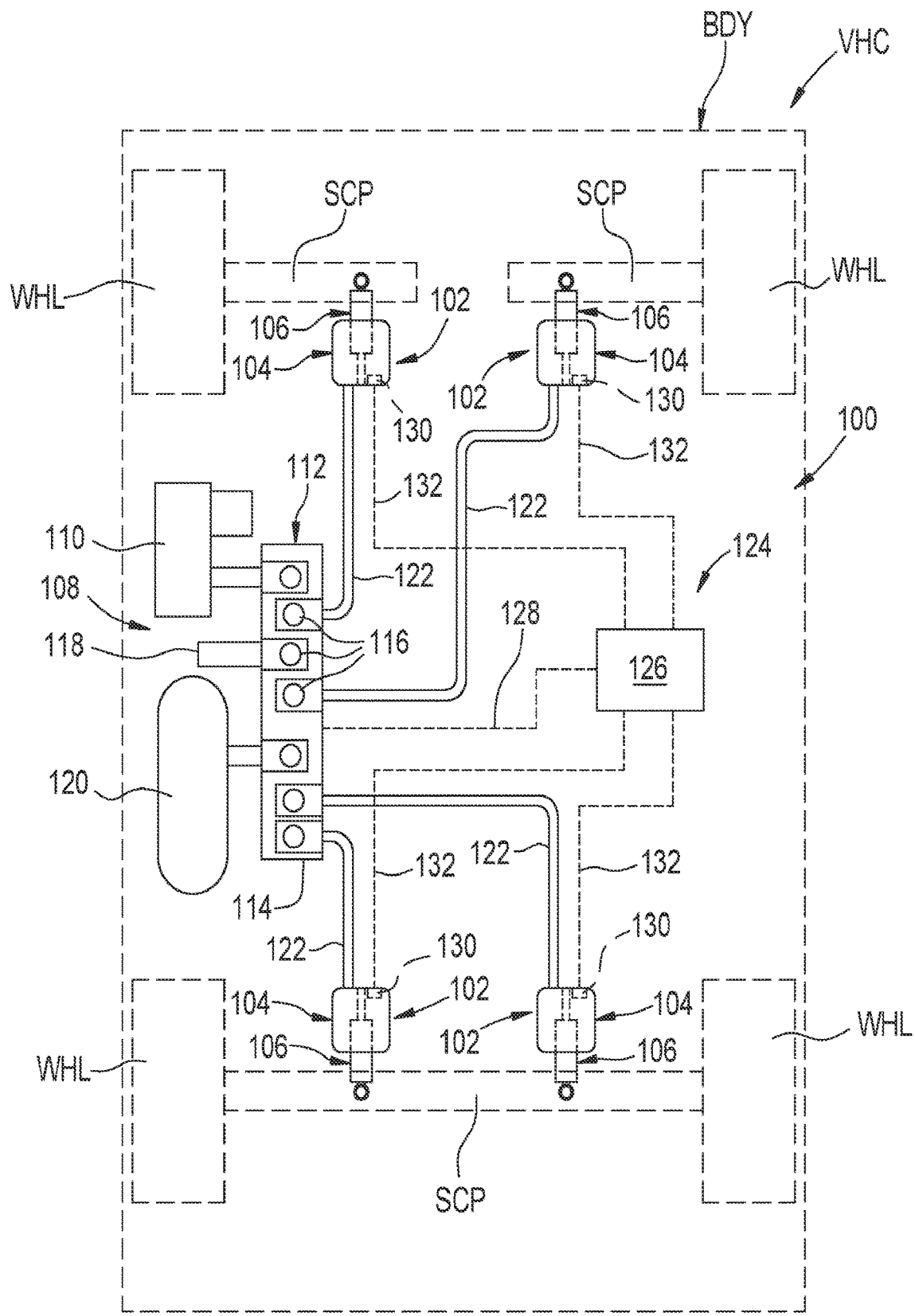
FIG. 1 is a schematic representation of one example of a suspension system of an associated vehicle that includes one or more gas spring and damper assemblies in accordance with the subject matter of the present disclosure.
Figure 2:
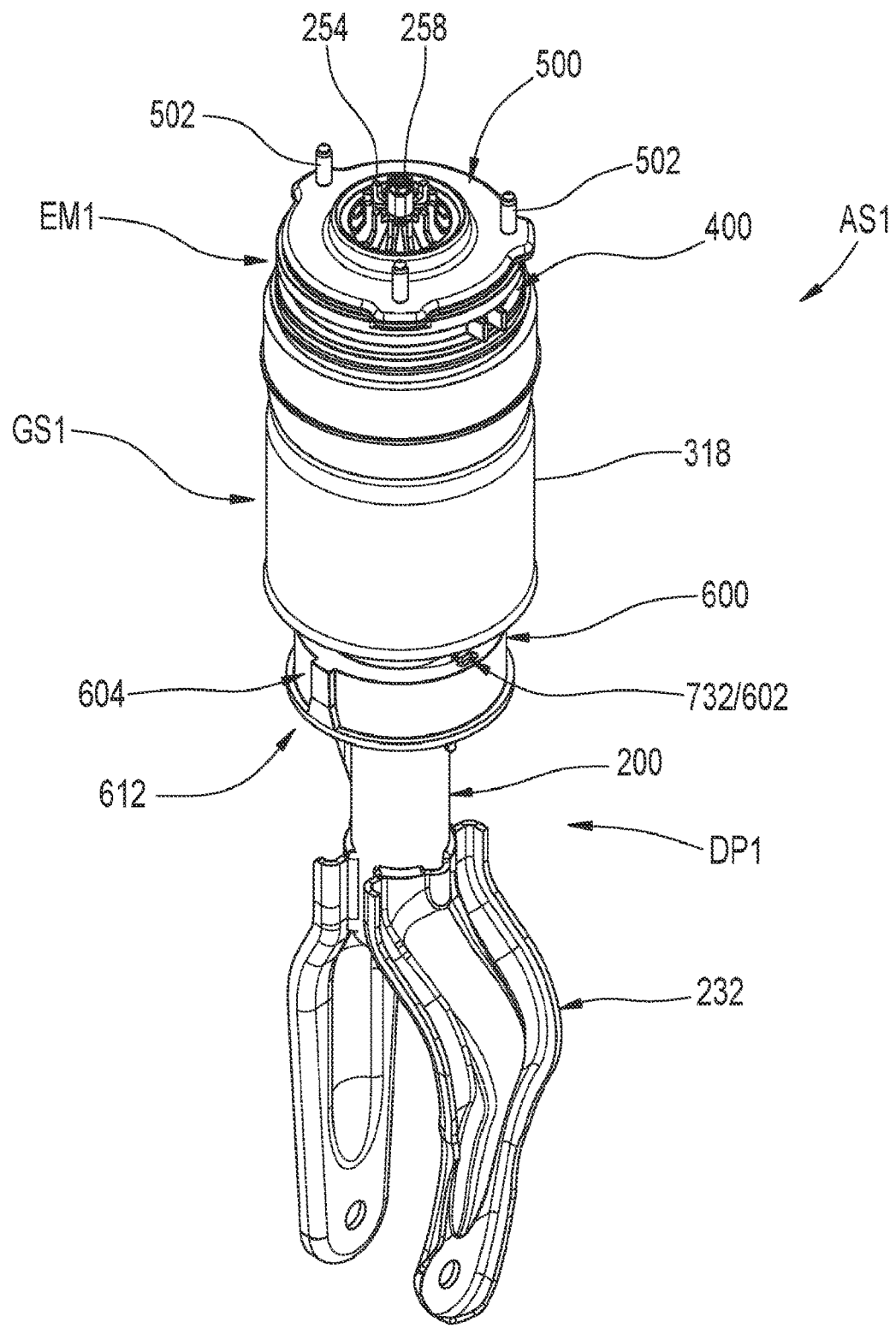
FIG. 2 is a top perspective view of one example of a gas spring and damper assembly in accordance with the subject matter of the present disclosure.

FIG. 1 illustrates one example of a suspension system 100 operatively disposed between a sprung mass, such as an associated vehicle body BDY, for example, and an unsprung mass, such as an associated wheel WHL or an associated suspension component SCP, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system can include any suitable number of gas spring and damper assemblies. For example, in the arrangement shown in FIG. 1, suspension system 100 includes four gas spring and damper assemblies 102, one of which is disposed toward each corner of the associated vehicle adjacent a corresponding wheel WHL. It will be appreciated, however, that any other suitable number of gas spring and damper assemblies could alternately be used in any other configuration and/or arrangement. As shown in FIG. 1, gas spring and damper assemblies 102 are supported between suspension components SCP and body BDY of associated vehicle VHC, and include a gas spring (or gas spring assembly) 104 and a damper (or damper assembly) 106. It will be recognized that gas springs 104 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary arrangement shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas for an extended period of time (e.g., seconds, minutes, hours, weeks, days, months).

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more sensing devices 130, such as, for example, may be operatively associated with the gas spring and damper assemblies and capable of outputting or otherwise generating data, signals and/or other communications having a relation to one or more of: a height of the gas spring and damper assemblies; a distance between other components of the vehicle; a pressure or temperature having a relation to the gas spring and damper assembly and/or a wheel or tire or other component associated with the gas spring and damper assembly; and/or an acceleration, load or other input acting on the gas spring and damper assembly. Sensing devices 130 can be in communication with ECU 126, which can receive the data, signals and/or other communications therefrom. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 7:
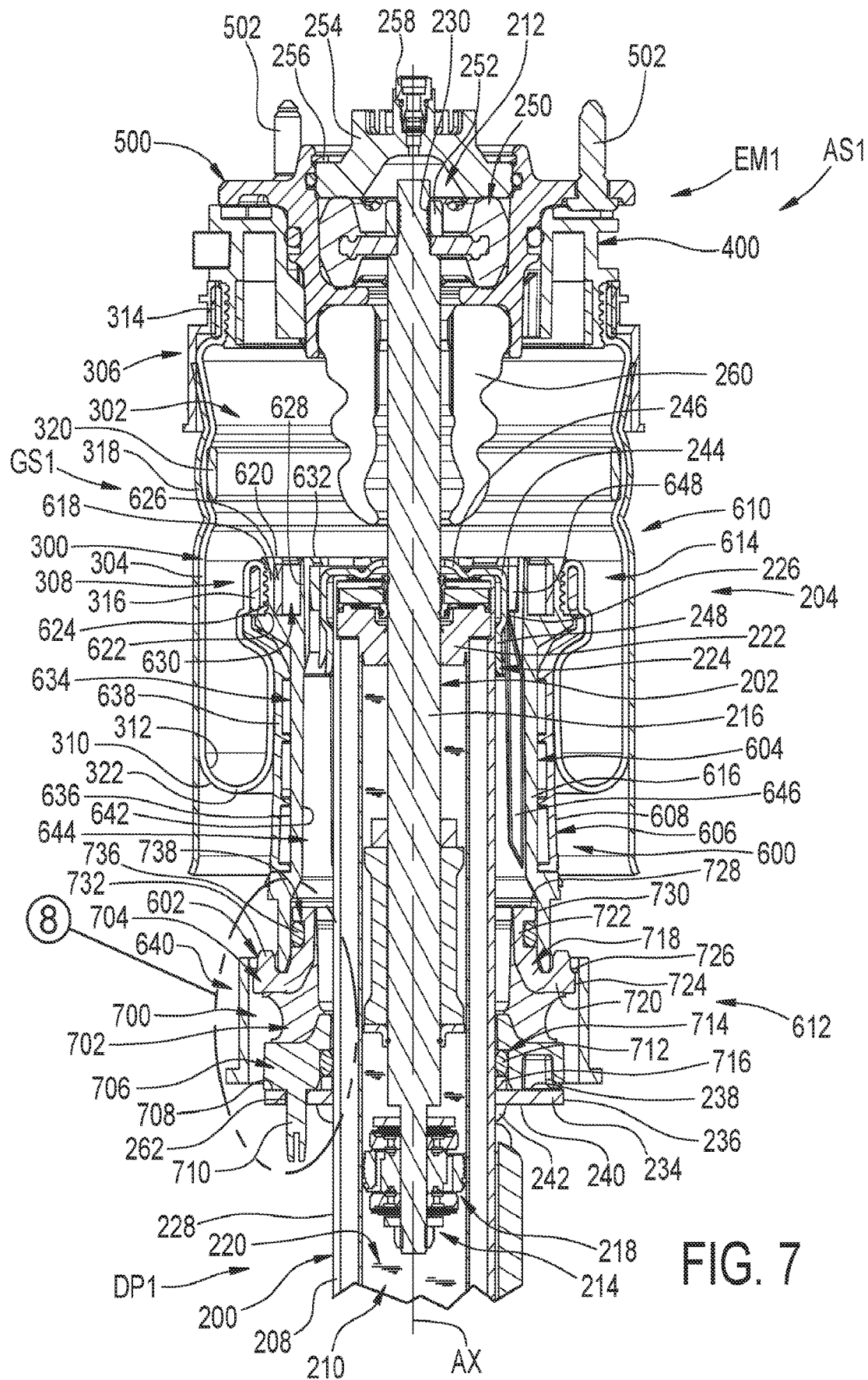
FIG. 7 is a cross-sectional side view of the gas spring and damper assembly in FIGS. 2-6 taken from along line 7-7 in FIG. 5.
Figure 8:
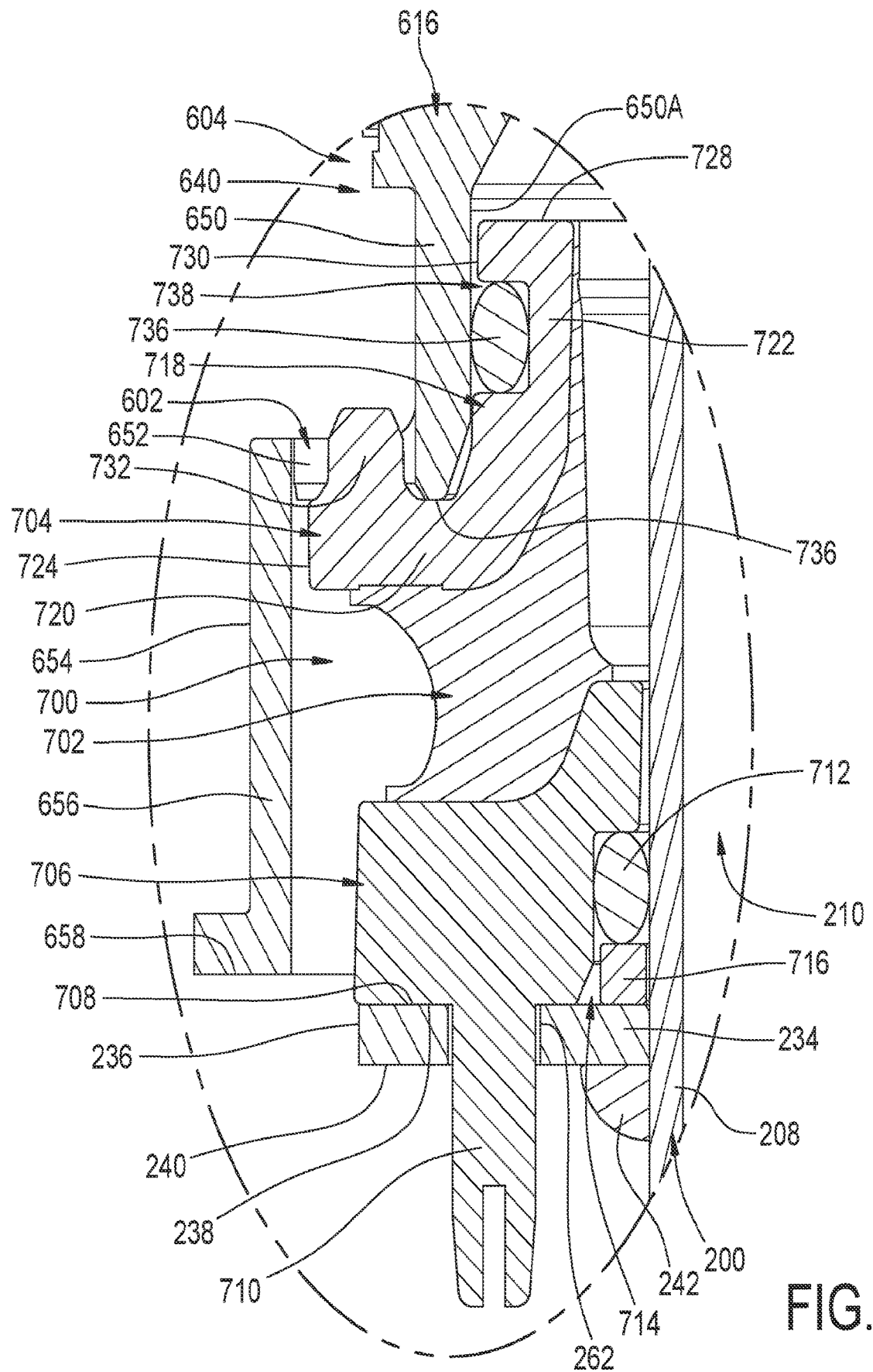
FIG. 8 is an enlarged view of the portion of the gas spring and damper assembly of FIGS. 2-7 identified as Detail 8 in FIG. 7.
Figure 9:
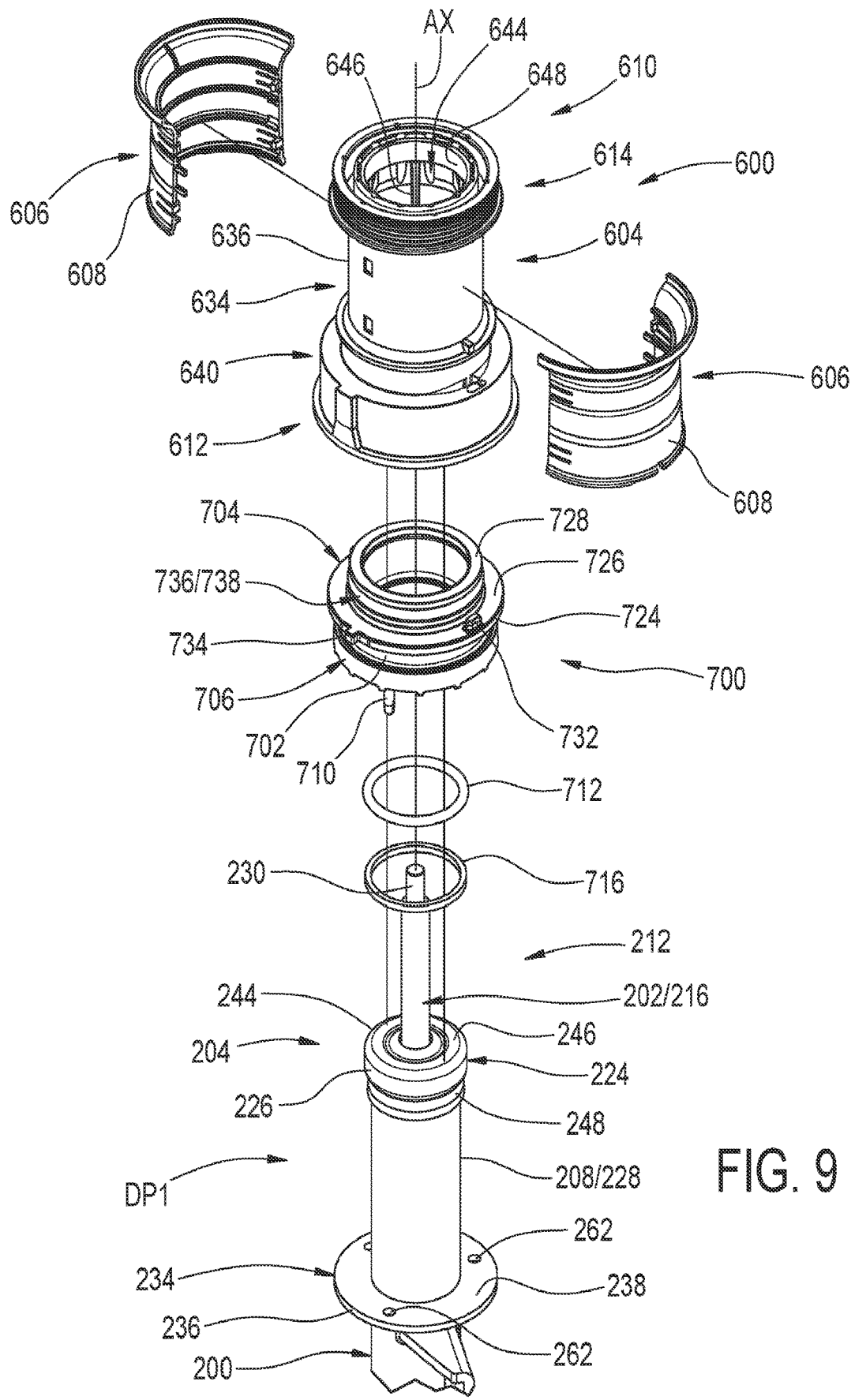
FIG. 9 is an exploded view of an end member assembly in accordance with the subject matter of the present disclosure, such as is shown in FIGS. 2-8, for example.
Figure 10:
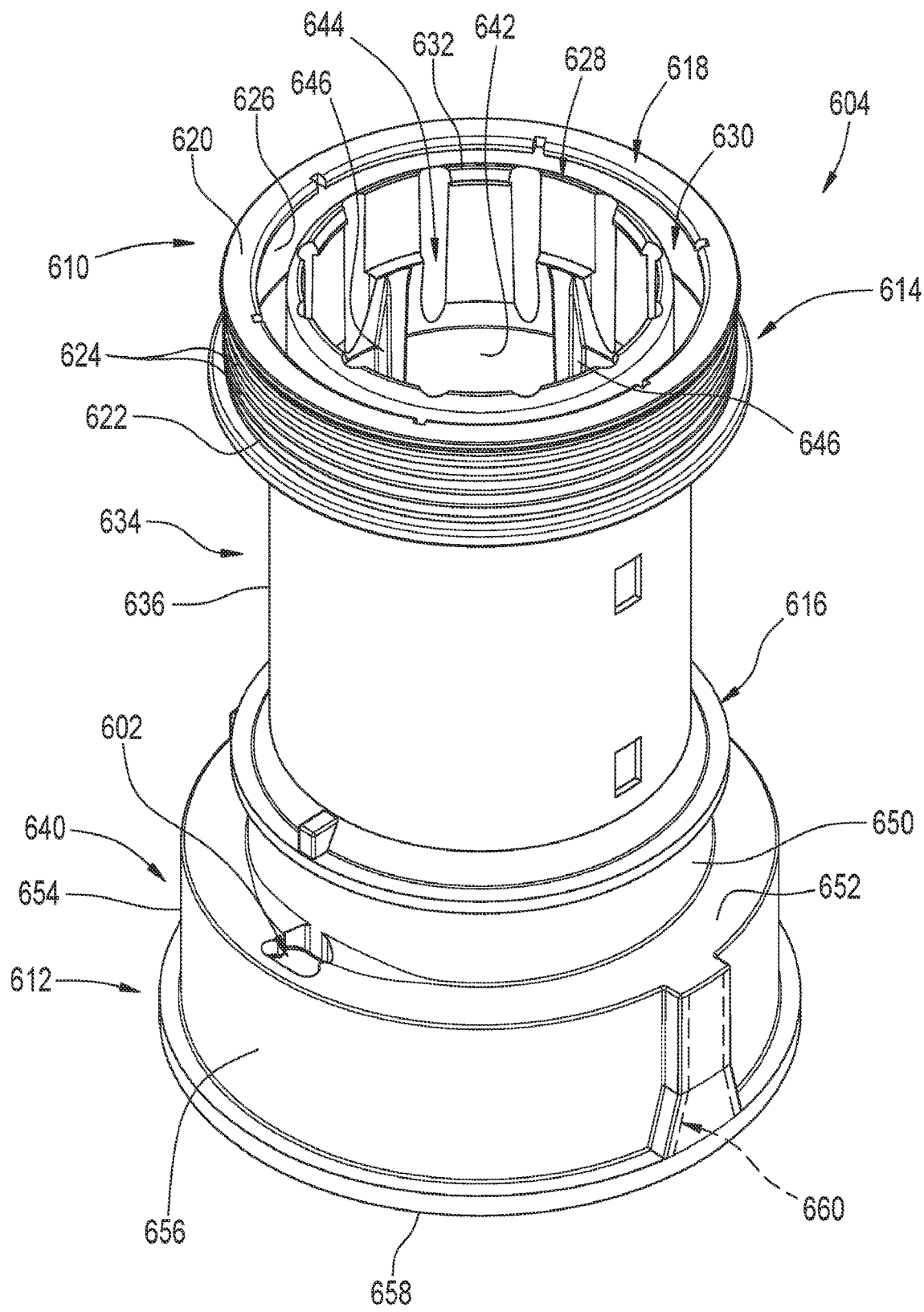
FIG. 10 is a top perspective view of an end member in accordance with the subject matter of the present disclosure, such as is shown in FIGS. 2-9, for example.
Figure 11:
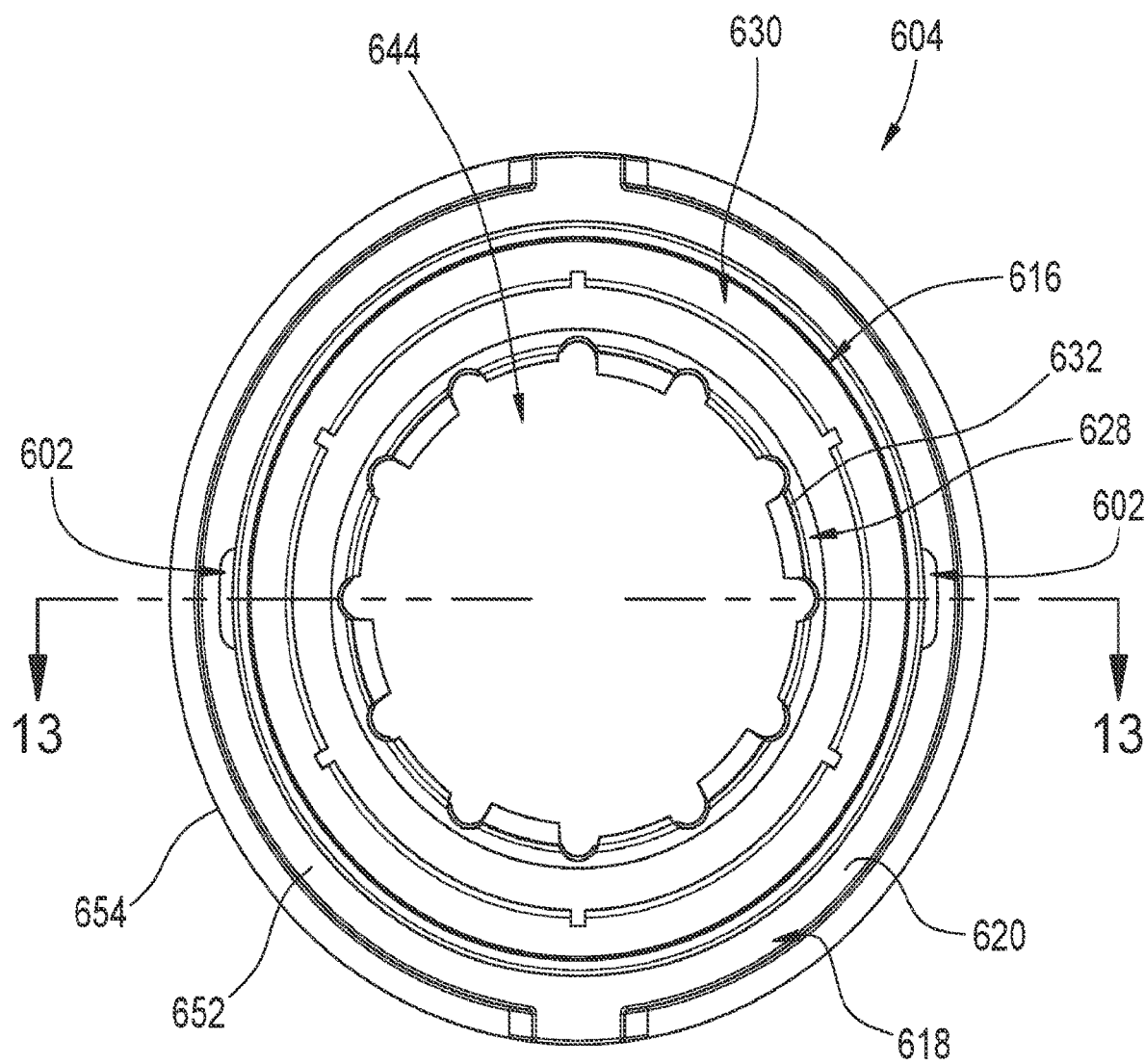
FIG. 11 is a top plan view of the end member in FIGS. 2-10.
Figure 12:
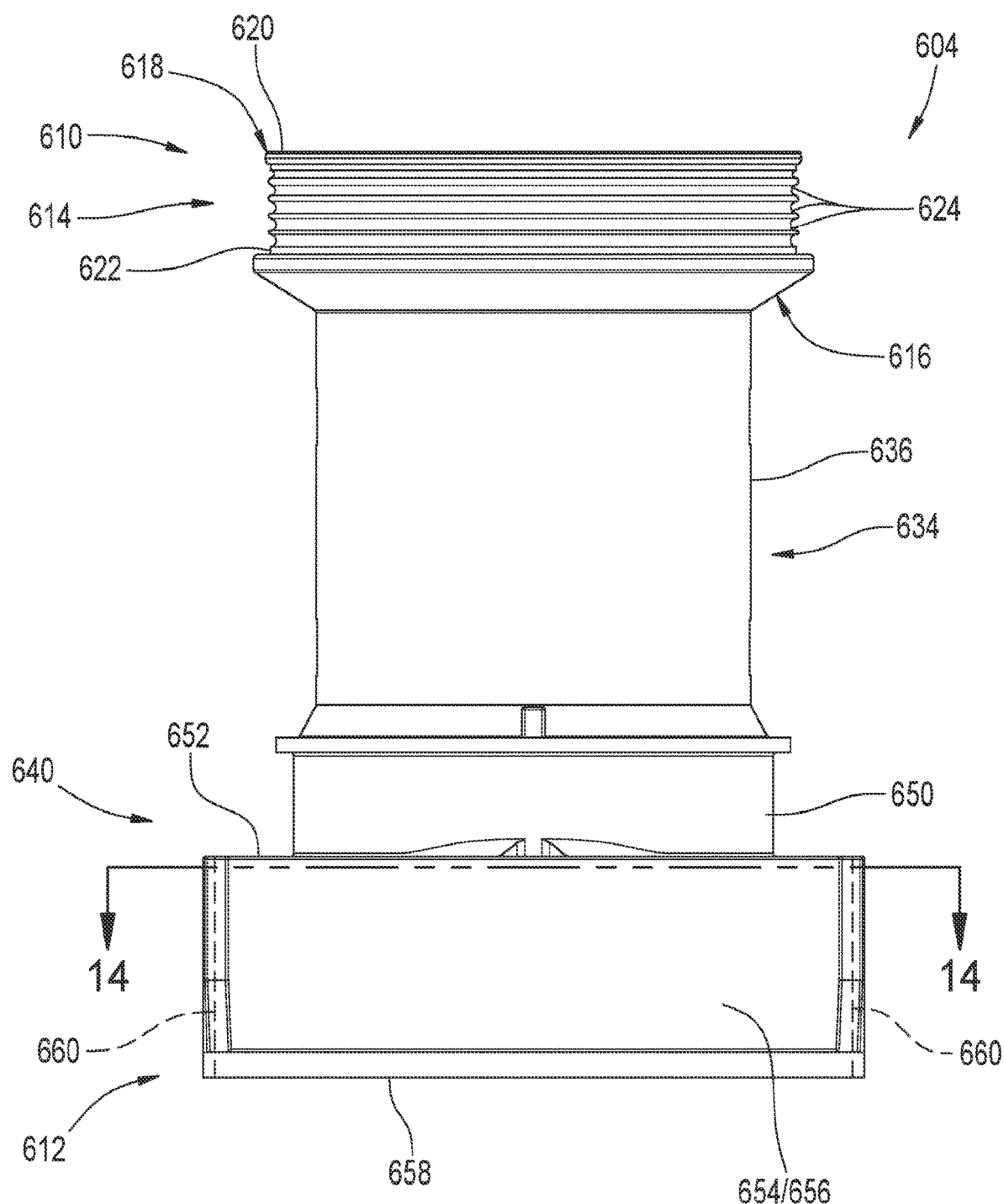
FIG. 12 is a side elevation view of the end member in FIGS. 2-11.
Figure 13:
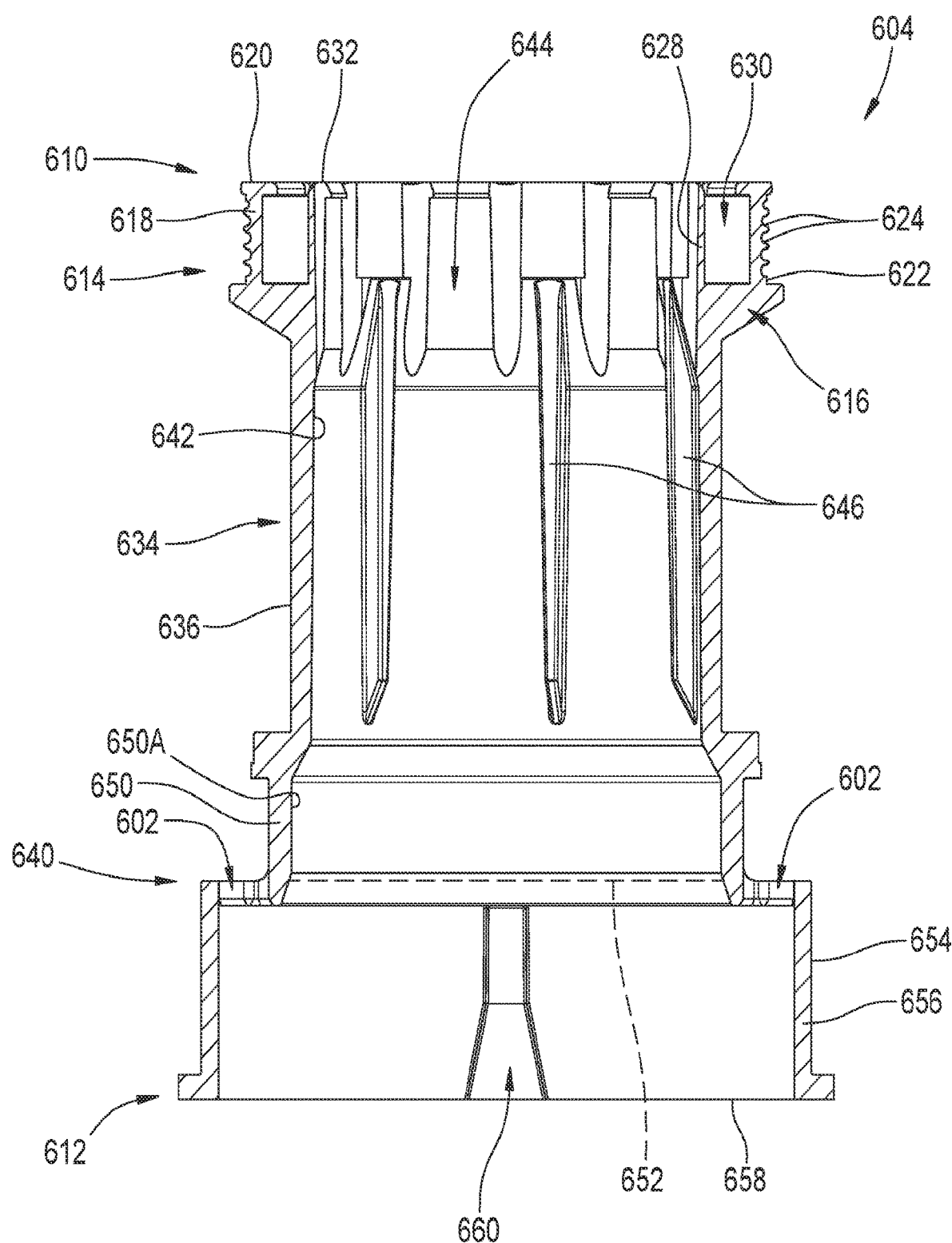
FIG. 13 is a cross-sectional side view of the end member in FIGS. 2-12 taken from along line 13-13 in FIG. 11.
Figure 14:
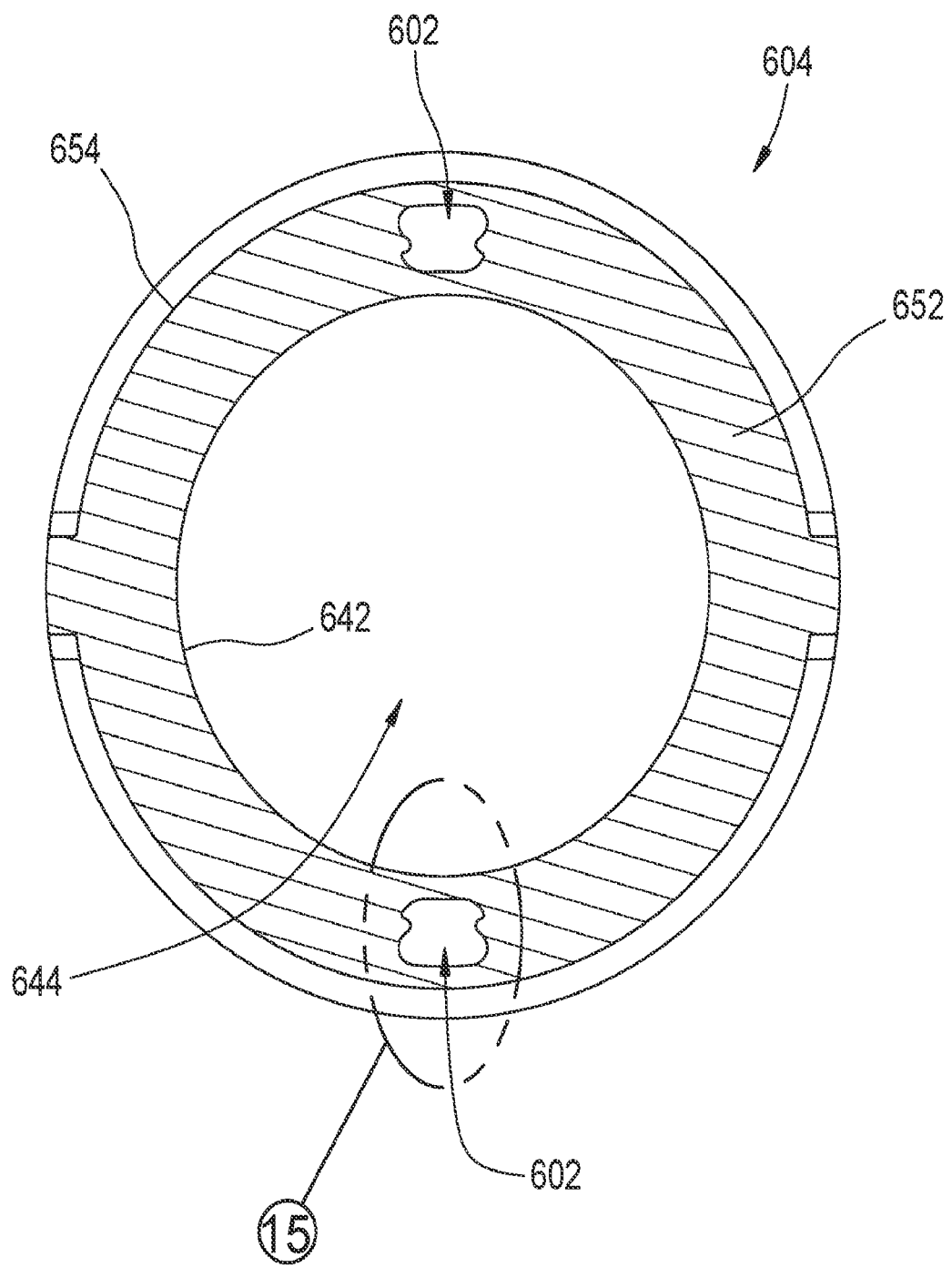
FIG. 14 is cross-sectional plan view of the end member in FIGS. 2-13 taken from along line 14-14 in FIG. 12.

Having described an example of a suspension system (e.g., suspension system 100) that can include gas spring and damper assemblies in accordance with the subject matter of the present disclosure, an example of such a gas spring and damper assembly will now be described in connection with FIGS. 2-9. As shown therein, a gas spring and damper assembly AS1, such as may be suitable for use as one or more of gas spring and damper assemblies 102 in FIG. 1, is shown as including a gas spring (or gas spring assembly) GS1, such as may correspond to one of gas springs 104 in FIG. 1, for example, and a damper (or damper assembly) DP1 such as may correspond to one of dampers 106 in FIG. 1, for example. Gas spring assembly GS1 and damper assembly DP1 can be disposed in a coextensive arrangement with one another, and can be operatively secured to one another in any suitable manner, such as is described hereinafter, for example. A longitudinal axis AX extends lengthwise along assembly AS1, as shown in FIG. 7.

Damper assembly DP1 can include a damper housing 200 and a damper rod assembly 202 that is at least partially received in the damper housing. Damper housing 200 extends axially between housing ends 204 and 206, and includes a housing wall 208 that at least partially defines a damping chamber 210. Damper rod assembly 202 extends lengthwise between opposing ends 212 and 214 and includes an elongated damper rod 216 and a damper piston 218 disposed along end 214 of damper rod assembly 202. Damper piston 218 is received within damping chamber 210 of damper housing 200 for reciprocal movement along the housing wall in a conventional manner. A quantity of damping fluid 220 can be disposed within damping chamber 210, and damper piston 218 can be displaced through the damping fluid to dissipate kinetic energy acting on gas spring and damper assembly AS1. Though damper assembly DP1 is shown and described herein as having a conventional construction in which a hydraulic fluid is contained within at least a portion of damping chamber 210, it will be recognized and appreciated that dampers of other types, kinds and/or constructions, such as pressurized gas or "air" dampers, for example, could be used without departing from the subject matter of the present disclosure.

That is, it will be appreciated that a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Housing wall 208 can form an opening (not numbered) along housing end 204. A damper end wall 222 can extend across the opening and can be secured on or along housing wall 218 such that a substantially fluid-tight connection is formed therebetween. Damper end wall 222 can include an opening (not numbered) and elongated damper rod 216 can extend axially outward from damping chamber 210 through the opening in a direction opposite housing end 206. Additionally, a damper end wall (not numbered) can be connected across end 206 of damper housing 200 such that a substantially fluid-tight connection is formed therebetween. In some cases, an end cap 224 (which is sometimes referred to in the art as a striker cap) that includes an outer side surface portion 226 can be supported on or along end 204 of damper housing 200. In other cases, an outside surface portion 228 of housing wall 208 can be exposed on or along end 204 of the damper housing.

Elongated damper rod 216 can project outwardly from damper end wall 222 such that end 212 of the damper rod assembly is outwardly exposed from the damper housing and is externally accessible with respect to the damper housing. A connection structure 230, such as a plurality of threads, for example, can be provided on or along the elongated rod for use in operatively connecting gas spring and damper assembly 200, either directly or indirectly, to an associated vehicle structure, a component of gas spring assembly GS1 or another component of gas spring and damper assembly AS1.

Figure 3:
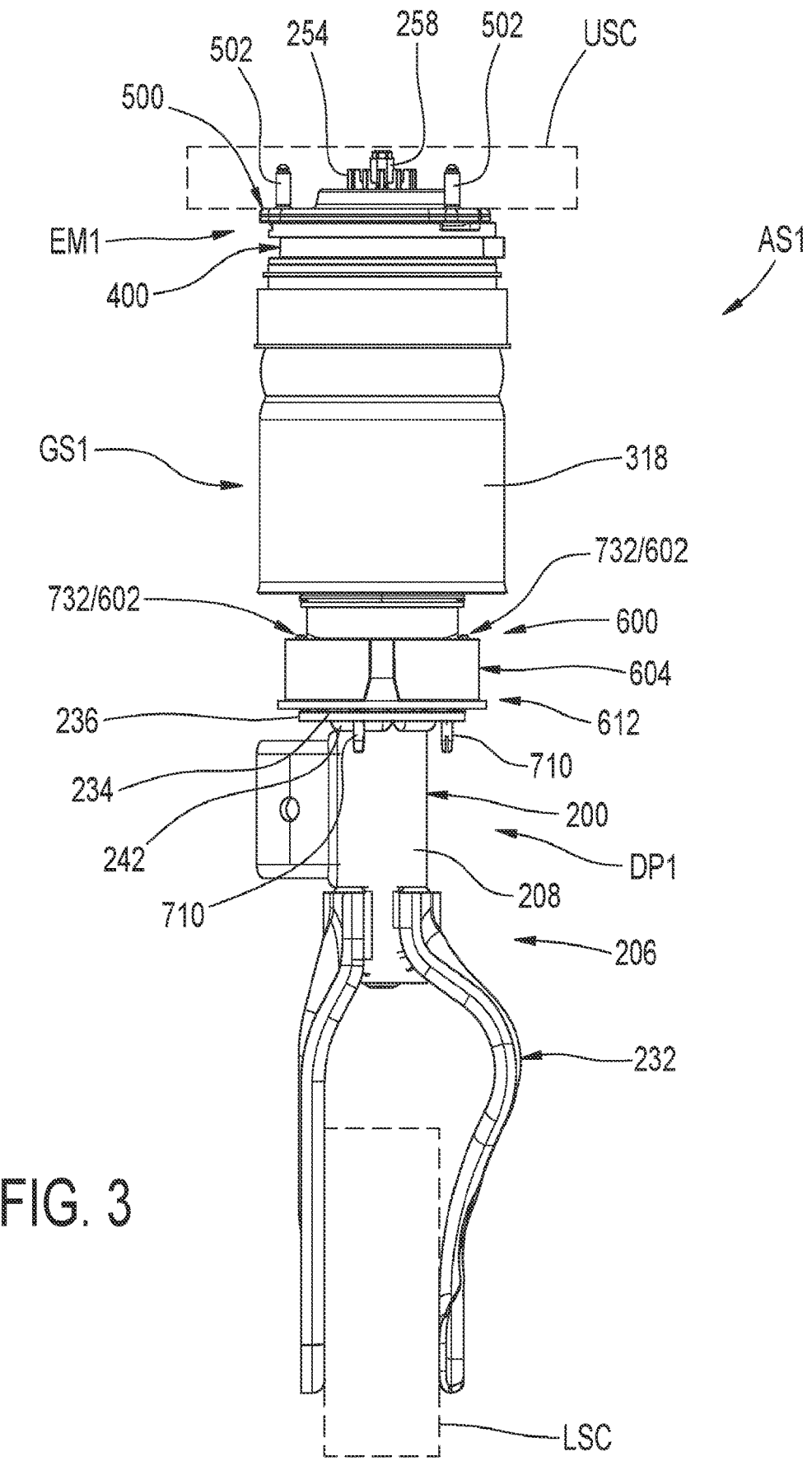
FIG. 3 is a side elevation view of the gas spring and damper assembly in FIG. 2.
Figure 4:
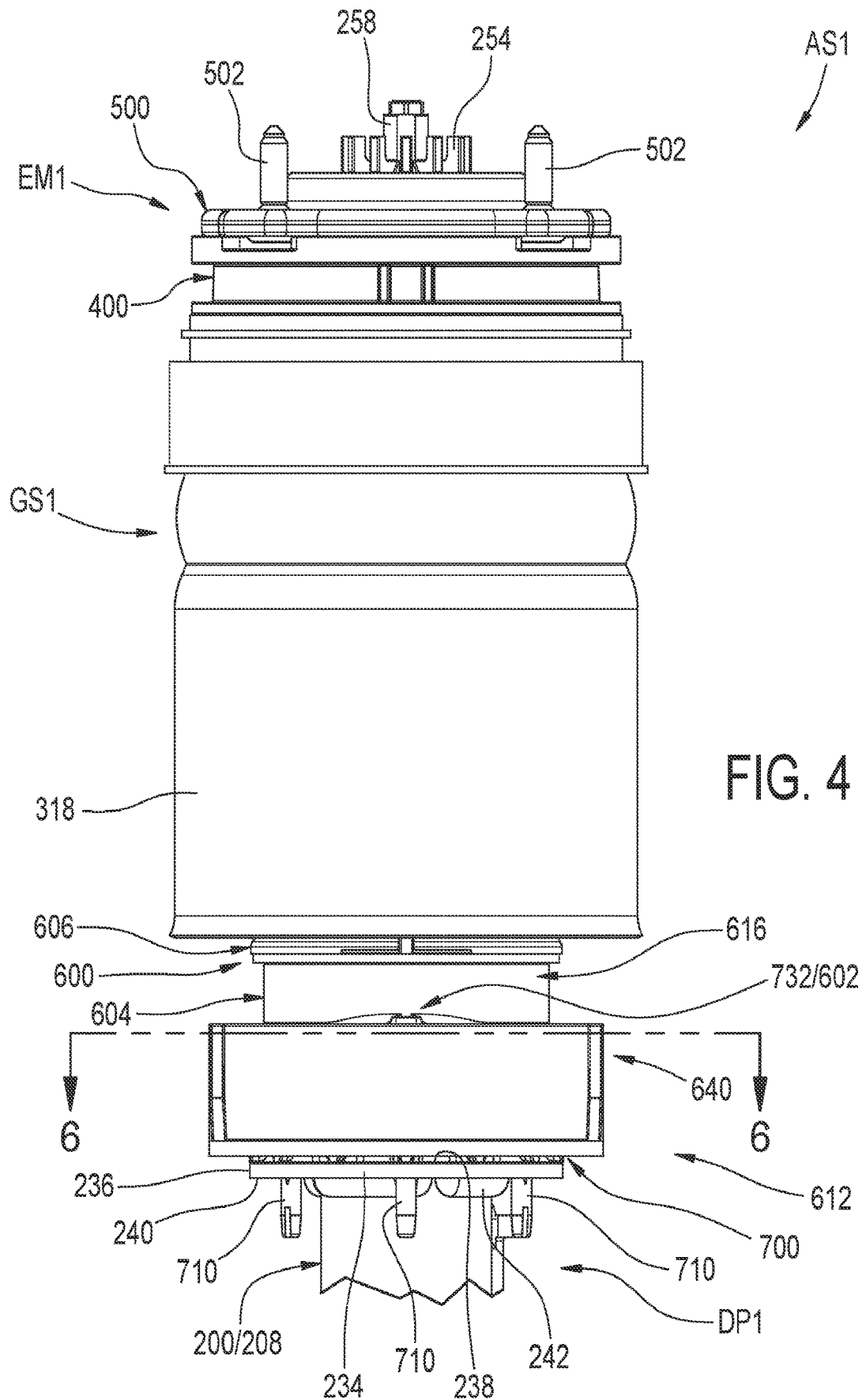
FIG. 4 is a front elevation view of the gas spring and damper assembly in FIGS. 2 and 3.
Figure 5:
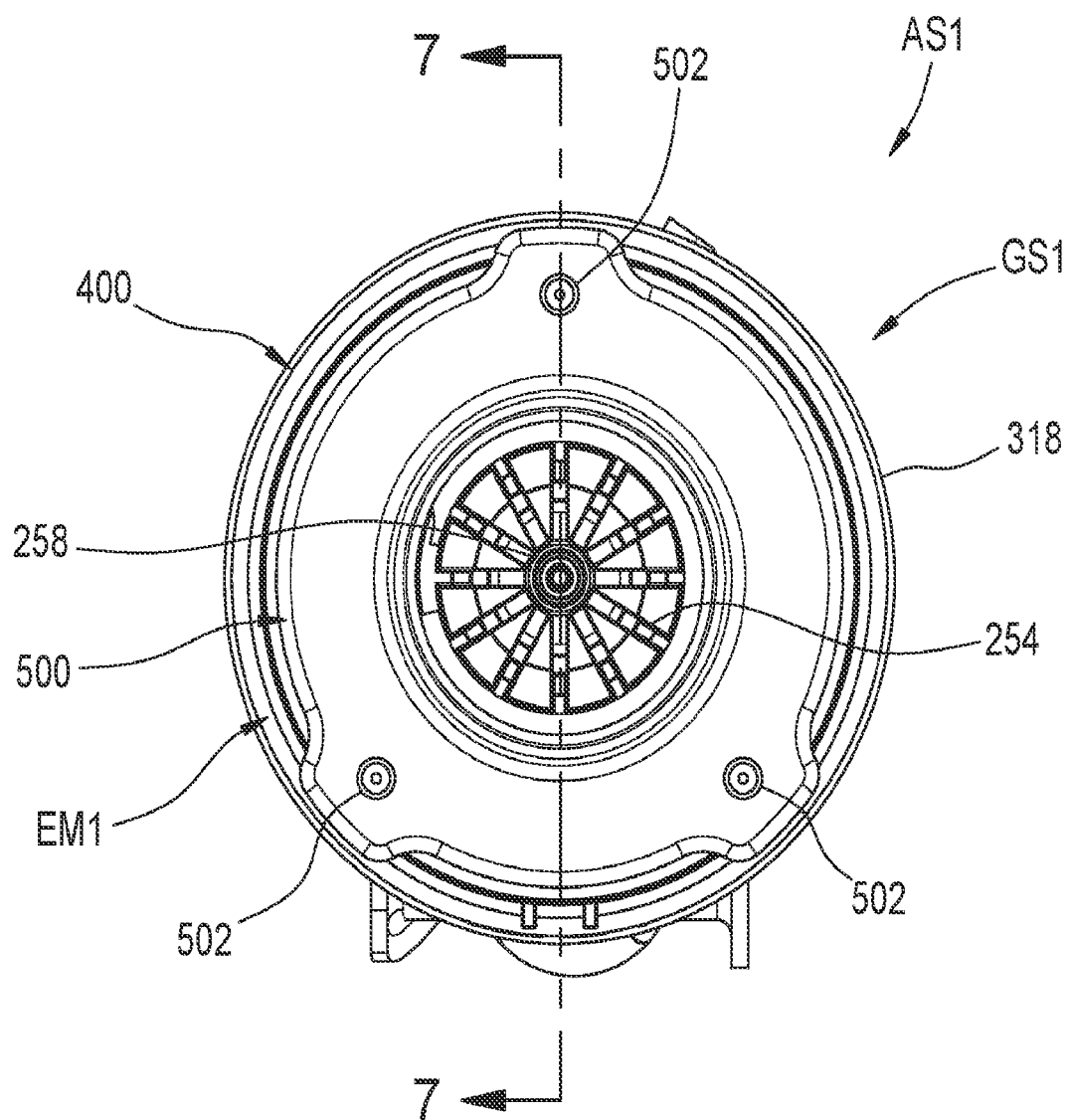
FIG. 5 is a top plan view of the gas spring and damper assembly in FIGS. 2-4.
Figure 6:
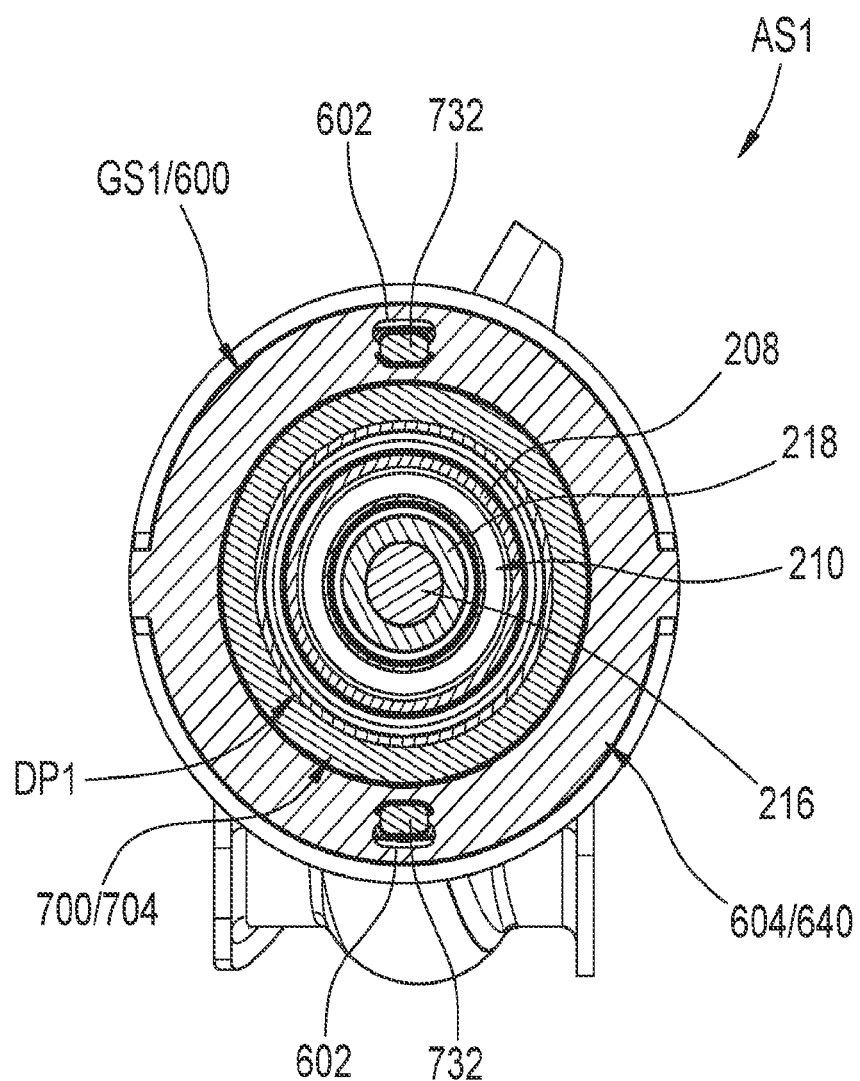
FIG. 6 is a cross-sectional plan view of the gas spring and damper assembly in FIGS. 2-5 taken from along line 6-6 in FIG. 4.

It will be appreciated that gas spring and damper assembly AS1 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 3, for example, end 212 of damper rod assembly 202 can be operatively engaged (either directly or indirectly) with a first or upper structural component USC, such as associated vehicle body BDY in FIG. 1, for example, and can be secured thereon in any suitable manner. As one non-limiting example, gas spring and damper assembly AS1 can include an end member assembly EM1 that can be secured to upper structural component USC and to which one or more components of gas spring assembly GS1 and/or one or more components of damper assembly DS1 can be operatively connected. Additionally, or in the alternative, damper assembly DP1 can include a mounting bracket 232 disposed along end 206 of damper housing 200, which can be secured on or along a second or lower structural component LSC (FIG. 3), such as associated suspension component SCP in FIG. 1, for example, and can be secured thereon in any suitable manner.

Gas spring assembly GS1 can include a flexible spring member 300 that can extend peripherally around axis AX and can be secured between opposing end members (or end member assemblies) in a substantially fluid-tight manner such that a spring chamber 302 is at least partially defined therebetween. As a non-limiting example, end member assembly EM1 can include an end member 400 to which one end of flexible spring member 300 can be secured and an end member 500 to which end 212 of damper rod assembly 202 can be operatively connected. Additionally, or in the alternative, gas spring assembly GS1 can include an end member assembly 600 that is supported on or along damper housing 200. The end of flexible spring member 300 that is opposite end member 400 can be secured on or along end member assembly 600 in any suitable manner. Additionally, it will be appreciated that end member 600 can be operatively supported on or along damper housing 200 in a suitable manner. As a non-limiting example, damper assembly DP1 can include a support wall or support wall portion 234 that extends radially outward from along the damper housing toward an outer peripheral edge 236. Support wall portion 234 can include a surface portion 238 facing toward end 204 of damper housing 200 and a surface portion 240 facing toward end 206 of the damper housing. Support wall portion 234 can be supported on or along the damper housing in any suitable manner, such as by way of one or more flowed-material joints 242, for example. If included, end cap 224 can include a cap wall 244 with an end wall portion 246 oriented transverse to longitudinal axis AX and a side wall portion 248 extending axially about the longitudinal axis. Side wall portion 248 can include outer side surface portion 226 that faces radially outward and forms an outermost peripheral extent of damper assembly DP1 along end 204 of the damper housing.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 2-9 as including a flexible wall 304 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 400 of end member assembly EM1 and/or suitable for forming a substantially fluid-tight connection with end member assembly 600. As one example, flexible spring member 300 can include open ends that are secured on or along the corresponding end members by way of one or more crimp rings 314 and 316. Alternately, a mounting bead (not shown) can be disposed along either or both of the ends of the flexible wall. In some cases, the mounting bead, if provided, can, optionally, include a reinforcing element, such as an endless, annular bead wire, for example. In some cases, a restraining cylinder 318 and/or other components can be disposed radially outward along flexible wall 304. In some cases, such components can be secured on or along the flexible wall in a suitable manner, such as by way or one or more backing rings 320, for example.

As mentioned above, gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As shown in FIGS. 2-5, for example, end member 500 can include one or more fasteners 502 operable to secure end member assembly EM1 on or along upper structural component USC, such as associated vehicle body BDY in FIG. 1, for example. Damper assembly DP1 can be operatively connected to the upper structural component by way of end member assembly EM1, and can be operatively engaged with the end member assembly in any suitable manner. For example, damper assembly DP1 can include a bushing 250 supported on or along end member 500 and to which damper rod assembly 202 is secured, such as by way of a connector 252 engaging connection structure 230 along end 212 of elongated damper rod 216, for example. Bushing 250 can be supported on or along end member 500 and can be operatively secured thereto in any suitable manner. As a non-limiting example, bushing 250 could be captured between end member 500 and an end cap 254 that can be secured on or along the end member in a suitable manner, such as by way of a retaining ring 256, for example. In some cases, a connector fitting 258 can extend through or otherwise be disposed on or along end cap 254, such as may provide communicative coupling of electrical and/or pressurized gas systems and/or devices with gas spring and damper assembly AS1.

It will be appreciated that gas spring and damper assembly AS1 is displaceable, during use in normal operation, between extended and compressed conditions. In some cases, one or more jounce bumpers can be included to inhibit contact between one or more features and/or components of assembly AS1. For example, damper assembly DP1 can include a jounce bumper 260 positioned on or along elongated damper rod 216 within spring chamber 302. It will be appreciated that the jounce bumper, if provided, can be supported in any suitable manner. As a non-limiting example, jounce bumper 260 can be supported on end member assembly 500 to substantially inhibit contact between a component of damper assembly DP1 and end member assembly 500 during a full jounce condition of assembly AS1. It will be appreciated, however, that other configurations and/or arrangements could alternately be used.

Additionally, as discussed above, gas spring and damper assembly AS1 can experience or otherwise relative rotation during displacement between extended and compressed conditions. It will be appreciated that such relative rotation can be disadvantageous to flexible spring member 300, and that gas spring and damper assemblies commonly include on or more features, components and/or constructions operable to isolate such relative rotation from the flexible spring member. For example, in some cases, the operative connection to upper structural component USC can include one or more rotatable or twistable components. In such cases, end member assembly 600 can be directly supported in a substantially-fixed rotational position on or along the support wall of the damper assembly. In other cases, however, end member assembly EM1 can be secured on or along upper structural component USC in a substantially-fixed rotational orientation. In such cases, gas spring and damper assembly AS1 can include a torsional isolator 700 that can be supported on or along support wall portion 234 of damper assembly DP1. Torsional isolator 700 can include an elastomeric or otherwise compliant body 702 supported between a (comparatively) rigid body 704 and a (comparatively) rigid body 706. It will be appreciated that compliant body 702 can be permanently secured (i.e., inseparable without damage, destruction or material alteration of at least one of the component parts) to and/or between rigid bodies 704 and 706, such as by way of a cured joint (e.g., vulcanized) and/or a flowed-material joint.

It will be appreciated that torsional isolator 700 can be supported between support wall portion 234 and end member assembly 600 in any suitable manner. As a non-limiting example, rigid body 706 can include a surface portion 708 disposed in facing relation to surface portion 238 of support wall portion 234. Rigid body 706 can also include one or more mounting studs 710 or other securement devices that can extend through corresponding holes 262 in support wall portion 234. In such an arrangement, rigid body 706 can be supported on damper assembly DP1 in a substantially-fixed position in at least one axial direction and in a substantially-fixed rotational orientation. A seal 712 can be sealingly disposed between rigid body 706 and damper housing 200 such that a substantially fluid-tight arrangement is formed therebetween. In some cases, rigid body 706 can include an annular recess 714 extending into the rigid body from along surface portion 708, and seal 712 can be disposed within the annular recess together with a base ring 716 that supports the seal in axially-spaced relation to support wall portion 234.

Rigid body 704 can include a rigid body wall 718 with a flange wall portion 720 oriented transverse to longitudinal axis AX and a pilot wall portion 722 that extends axially from along flange wall portion 720 in a direction away from rigid body 706. Flange wall portion 720 can extend radially outward to an outer peripheral edge 724, and can include a surface portion 726 facing opposite surface portion 708. Pilot wall portion 722 extends axially toward a distal end surface portion 728 facing opposite surface portion 708, and includes an outer side surface portion 730 facing radially outward. Rigid body 704 can be operatively connected with end member assembly 600 such that a substantially-fixed rotational position is maintained therebetween. As such, rigid body 704 can include one or more projections 732 extending outward from along surface portion 726 that are received within corresponding passages 602 in the end member assembly, such as to transmit rotational forces and/or loads to, from and/or between rigid body 704 and the end member assembly. In some cases, one or more projections 734 can extend from along rigid body 704 in a direction transverse to longitudinal axis AX, such as from along outer peripheral edge 724, for example.

A seal 736 can be sealingly disposed between rigid body 704 and end member assembly 600 such that a substantially fluid-tight arrangement is formed therebetween. In some cases, rigid body 704 can include an annular groove 738 extending into the rigid body, such as from along outer side surface portion 730, and seal 732 can be at least partially received within the annular groove. It will be appreciated, however, that other configurations and/or arrangements can alternately be used. During use, rigid body 706 is maintained in a substantially-fixed rotational position relative to damper assembly DP1, and rigid body 704 is maintained in a substantially-fixed rotational position relative to end member assembly 600. As such, seal 712 and seal 734 each form a substantially-static seal arrangement between the corresponding components rather than forming a dynamic seal arrangement, such as may be used in known constructions. Accordingly, rotational displacement that may occur during use between one or more components of damper assembly DP1 and one or more components of gas spring assembly GS1 is isolated (or at least substantially reduced) from flexible spring member 300 by deflection of compliant body 702, which permits rigid bodies 704 and 706 to rotate relative to one another about longitudinal axis AX.

End member assembly 600 is of a type and kind commonly referred to as a roll-off piston or piston assembly. It will be appreciated that end member assembly 600 can include any suitable number of one or more components and/or elements. For example, in the arrangement shown and described herein, end member assembly 600 includes an end member core 604 that is disposed along and supported on damper housing 200, such as by way of torsional isolator 700, as described above. An end member shell (or shell section) 606 is supported on the end member core and can include an outer surface 608 along which a rolling lobe 322 of flexible spring member 300 can be displaced as gas spring and damper assembly AS1 is displaced between compressed and extended conditions. It will be appreciated that end member core 604 can be configured to receive and support one or more end member shells and/or shell sections, such as may have any one of a wide variety of different sizes, shapes and/or configurations (e.g., outer profiles with different combinations of contours and/or shapes).

Additionally, it will be appreciated that end member assembly 600 and the one or more components and/or elements thereof can be formed from any suitable material or combination of materials, and can include any suitable number or combination of one or more walls and/or wall portions. For example, end member core 604 and/or end member shell sections 606 can be formed from a suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

End member core 604 is shown as extending peripherally about axis AX and longitudinally between opposing ends 610 and 612. End member core 604 can include a first or upper mounting section 614 toward end 610 and on or along which end 308 of flexible spring member 300 can be operatively connected in a suitable manner. For example, retaining ring 316 can be crimped radially-inward or otherwise deformed to form a substantially fluid-tight connection between end 308 of flexible spring member 300 and mounting section 614 of end member core 604. In this manner, spring chamber 302 can be at least partially defined by flexible spring member 300 between end member 400 and end member assembly 600, such as has been described above.

End member core 604 can include a core wall 616 that extends peripherally about axis AX and longitudinally between ends 610 and 612. Core wall 616 can include a first or outer wall portion 618 disposed along end 610 that terminates at a distal edge 620. In some cases, outer wall portion 618 can at least partially define an outermost periphery along a longitudinal section of end member core 616, such as along mounting section 614, for example. Outer wall portion 618 can, optionally, include one or more engagement features disposed along an outer surface portion 622 thereof that may be suitable for engaging an end or other surface portion of flexible spring member 300 to thereby enhance retention of the flexible spring member and end member assembly in an assembled condition. As a non-limiting example, the one or more engagement features disposed on or along the outer surface of outer wall portion 618 can include a plurality of axially-spaced, endless, annular grooves 624. It will be appreciated, however, that other configurations and/or arrangements could alternately be used. A backing ring 626, such as may be formed as an endless, annular ring of metal or other rigid material, for example, can be disposed radially inward of outer wall portion 618 to provide increased rigidity and/or strength to the crimped connection between the flexible spring member and the end member core that is formed by retaining ring 324.

In some cases, outer wall portion 618 can take the form of an endless, annular wall that extends circumferentially about end member assembly 600. Core wall 616 can also include a second or inner wall portion 628 that is spaced radially-inward from outer wall portion 618 such that an annular channel 630 is formed therebetween. Inner wall portion 628 can extend peripherally about axis AX, and can extend axially toward a distal edge 632 that can, in some cases, be disposed in approximate alignment with distal edge 620 of outer wall portion 618. In such cases, the distal edge of inner wall portion 628 can, optionally, be disposed in a common plane with distal edge 620 of outer wall portion 618. Additionally, at least a portion of inner wall portion 628 can be co-extensive (i.e., extending in axially-overlapping relation with one another) with outer wall portion 618.

Core wall 616 of end member core 604 can also include a second or intermediate section 634 that extends from along upper mounting section 614 in a direction toward end 612 of the end member core. Intermediate section 634 can include an outer surface portion 636 dimensioned to receivingly engage one or more of end member shells or sections, which can be secured therealong in any suitable manner. As one example, the end member shell can include a shell wall 638 that can be split or, alternatively, formed into two or more shell wall sections 606 that can be assembled together around intermediate section 634. It will be appreciated, however, that other configurations and/or arrangements could alternately be used. Additionally, shell wall 638 can include a contoured outer surface portion (not numbered) that at least partially forms outer surface 608 of end member assembly 600 along which rolling lobe 322 is displaced during use.

Core wall 616 of end member core 604 can also include a third or lower mounting section 640 disposed at or along end 612 that can be dimensioned or otherwise configured to at least partially support end member assembly 600 in an axial direction on or along damper assembly DP1. Core wall 616 can also include an inner surface portion 642 that can at least partially define a passage 644 through end member core 604. Core wall 616 can, optionally, include one or more elongated ribs 646 that can be disposed in peripherally-spaced relation to one another about axis AX and can extend longitudinally along inner surface portion 642. If included, elongated ribs 646 can be dimensioned to form a sliding or clearance fit along outer surface 228 of damper housing 200. Additionally, a wear-reducing and/or friction-reducing band 648 can be disposed along mounting section 614, such as may be dimensioned for operative engagement with outer side surface portion 226 of end cap 224 and/or outside surface portion 228 of housing wall 208.

Core wall 616 can include one or more wall portions on or along lower mounting section 640 that are dimensioned to operatively engage at least torsional isolator 700 in a manner suitable transmitting rotational forces or loads therebetween. As one example, lower mounting section 640 of core wall 616 can include an inner side or pilot wall portion 650 that extends from along intermediate section 634 toward end 612. In some cases, wall portion 650 can be dimensioned to receivingly engage at least a portion of torsional isolator 700, such as on or along an inner surface portion 650A of wall portion 650, for example. An end wall portion 652 can extend radially outward from along inner side wall portion 650 to an outer peripheral surface portion 654. In some cases, an outer side wall portion 656 can extend axially from along end wall portion 652 toward a distal edge 658 of the end member core with outer side wall portion 656 disposed outward of inner side wall portion 650 such that end wall portion 652 extends therebetween. In some cases, outer side wall portion 656 can include one or more slots 660 extending from along distal edge 658 toward end wall portion 652. If provided, slots 660 can be dimensioned to at least partially receive one of projections 734 thereby orient and/or otherwise indexing end member core 604 in a rotation position relative to torsional isolator 700 such that projections 732 and passages 602 are at least approximately aligned for assembly.

Figure 15:
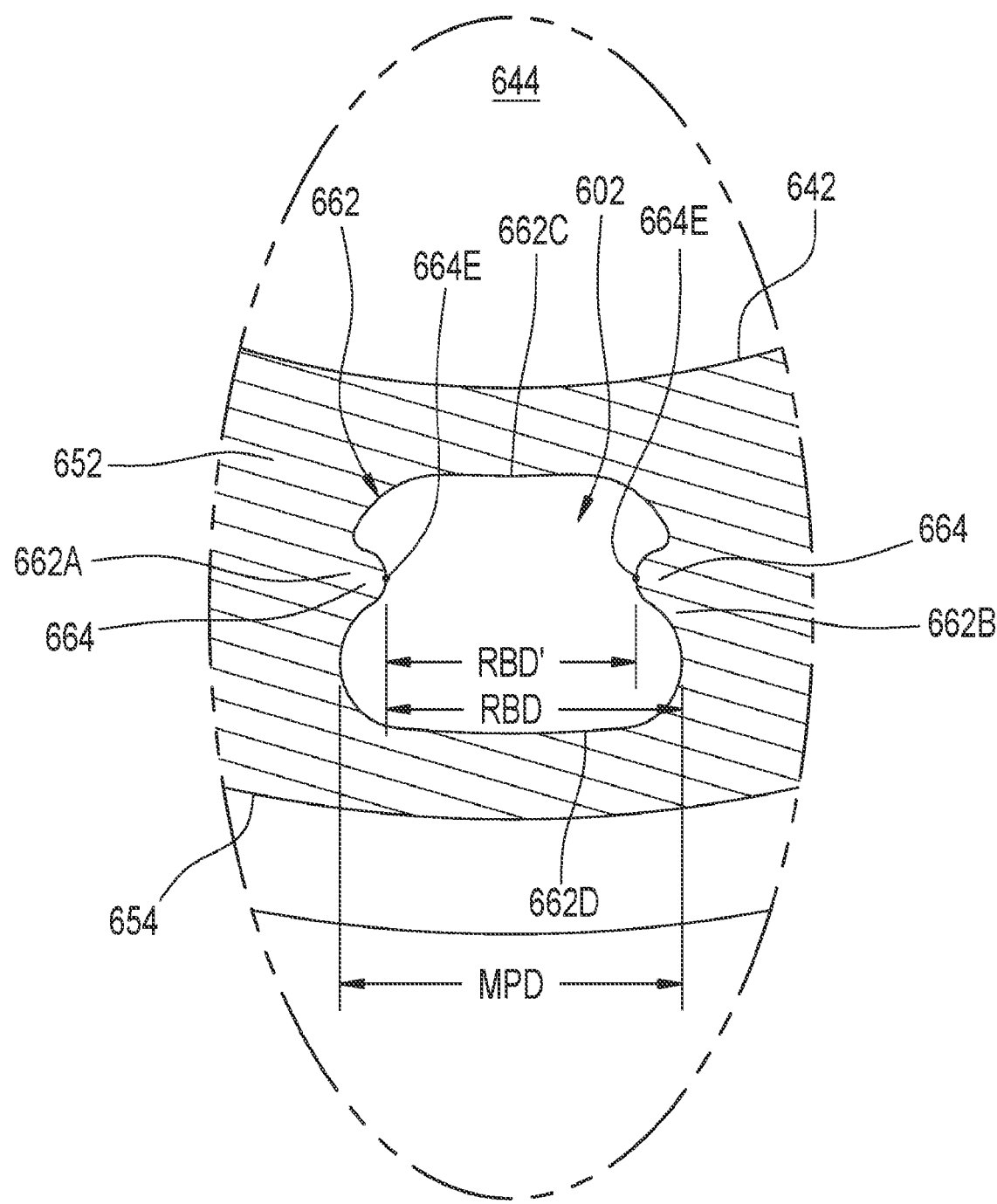
FIG. 15 is an enlarged view of the portion of the end member of FIGS. 2-14 identified as Detail 15 in FIG. 14.
Figure 16:
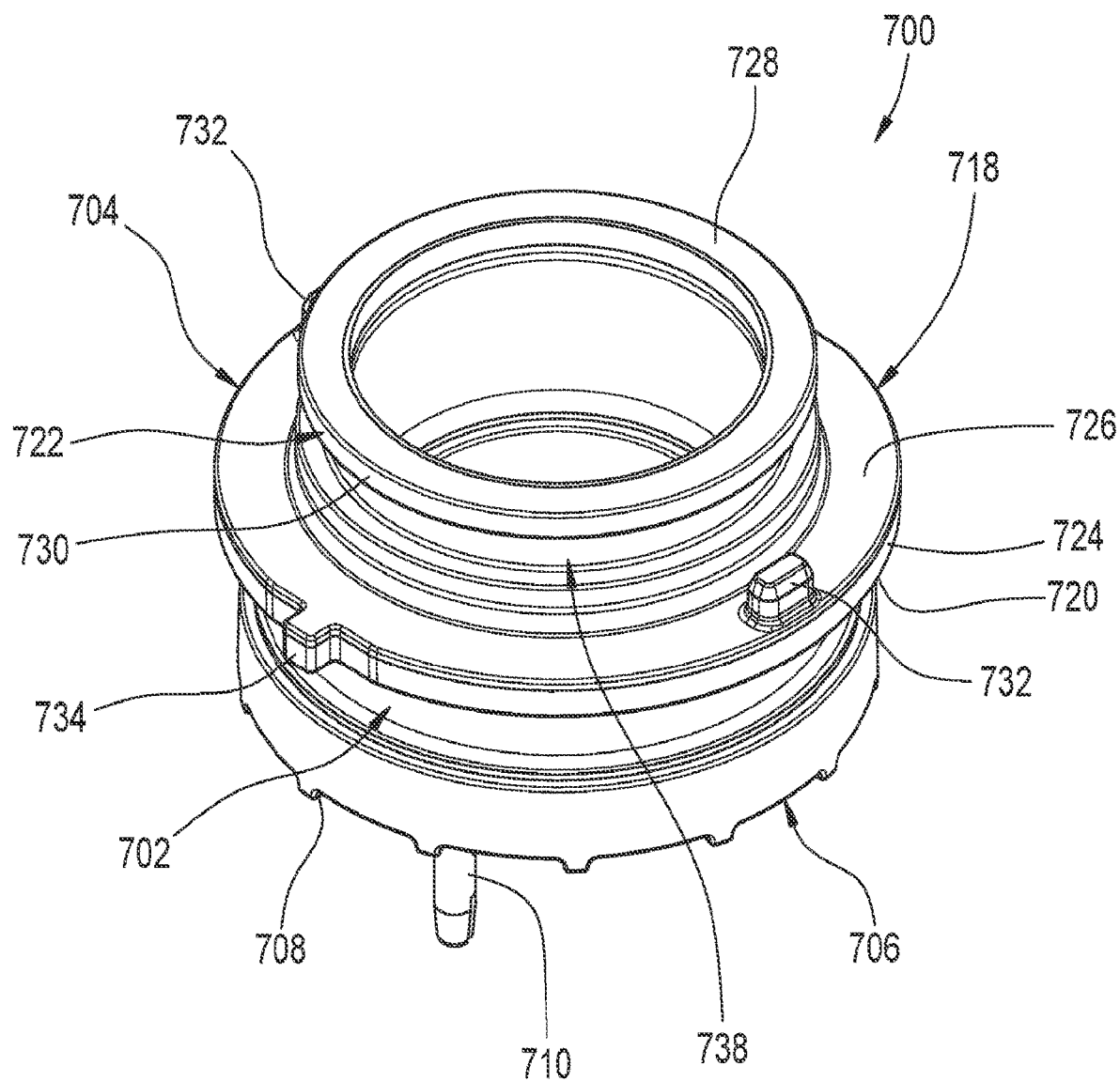
FIG. 16 is a top perspective view of a torsional isolator in accordance with the subject matter of the present disclosure, such as is shown in FIGS. 2-9, for example.
Figure 17:
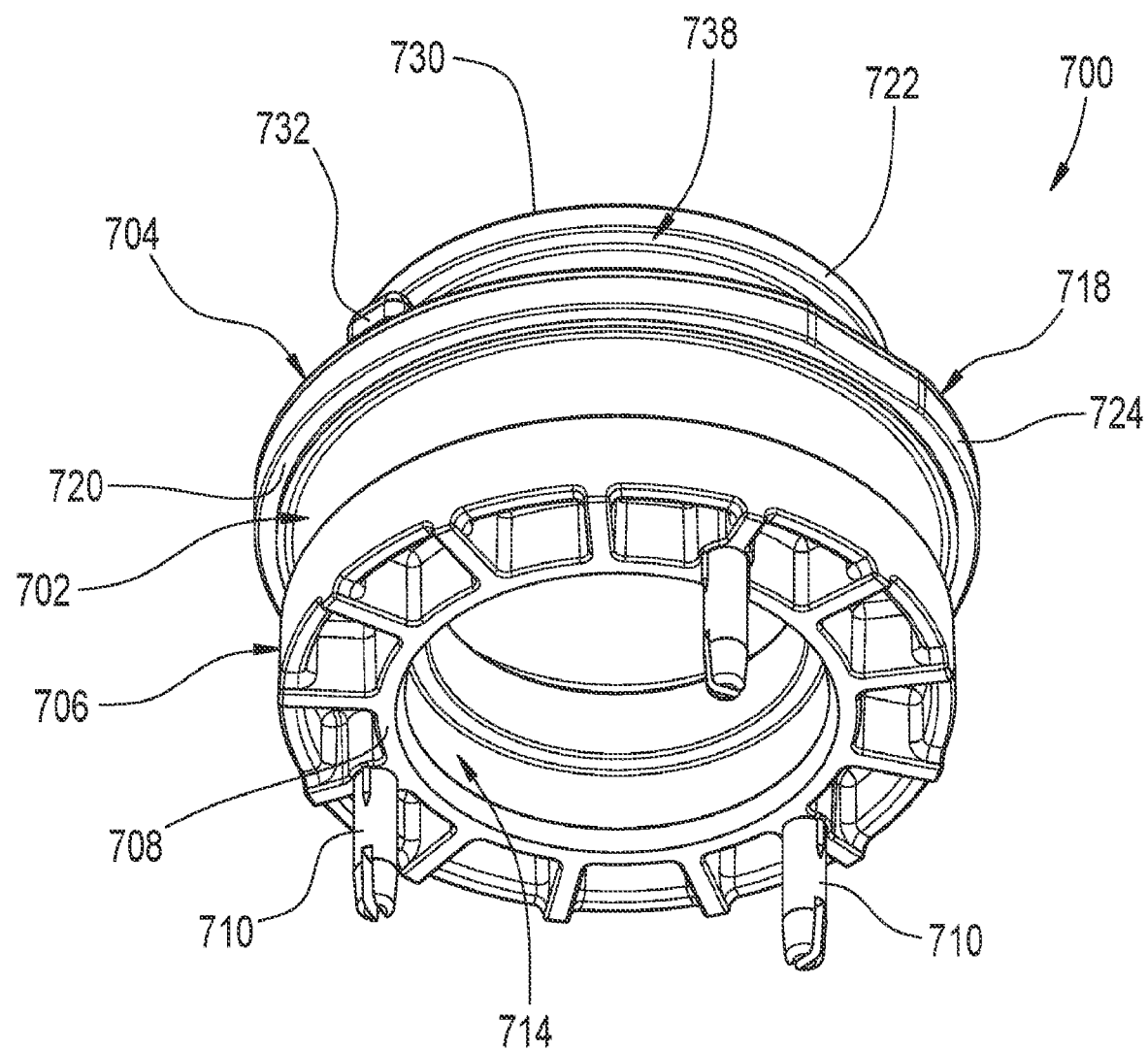
FIG. 17 is a bottom perspective view of the torsional isolator in FIGS. 2-9 and 16.
Figure 18:
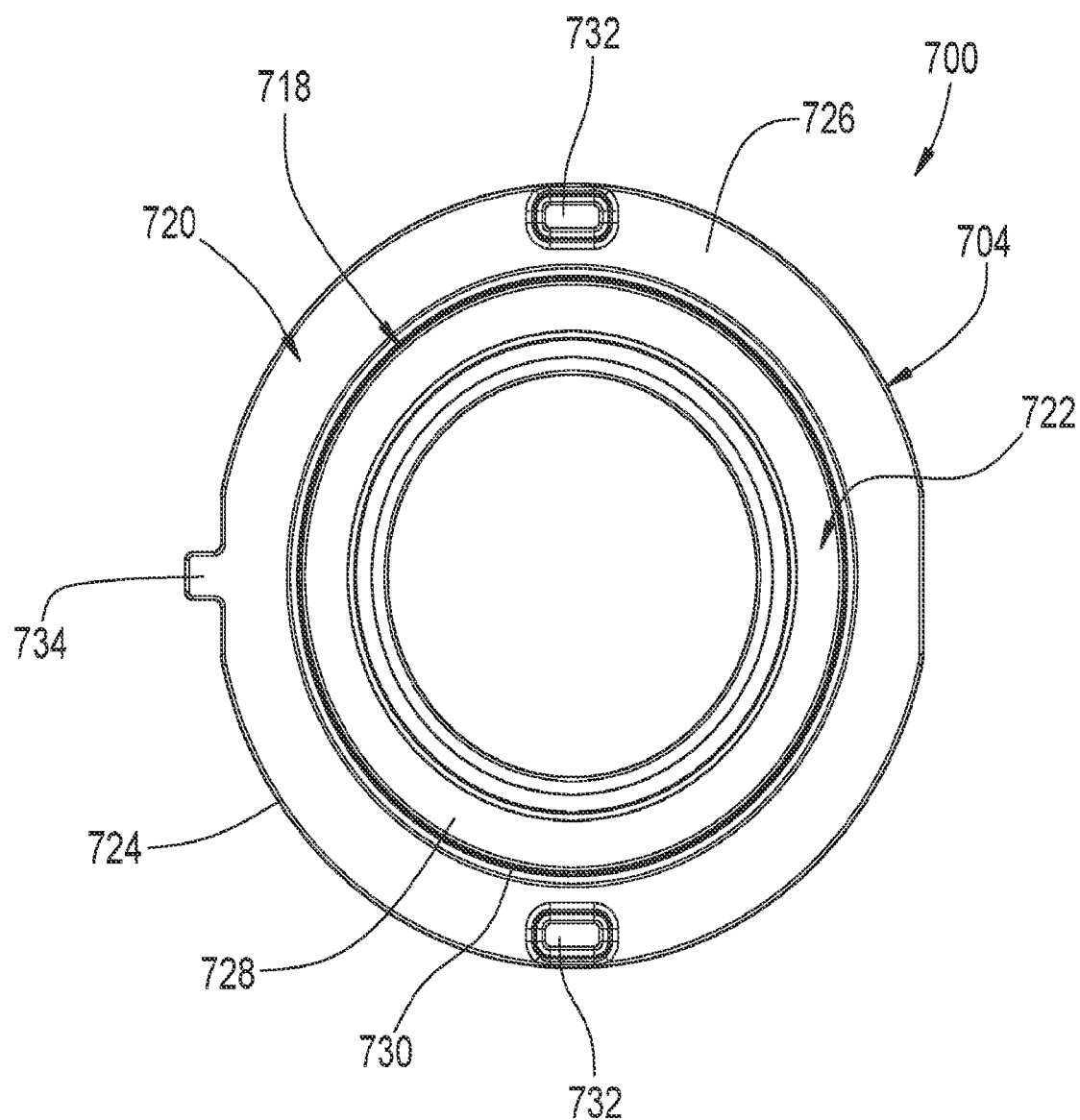
FIG. 18 is a top plan view of the torsional isolator in FIGS. 2-9, 16 and 17.
Figure 19:
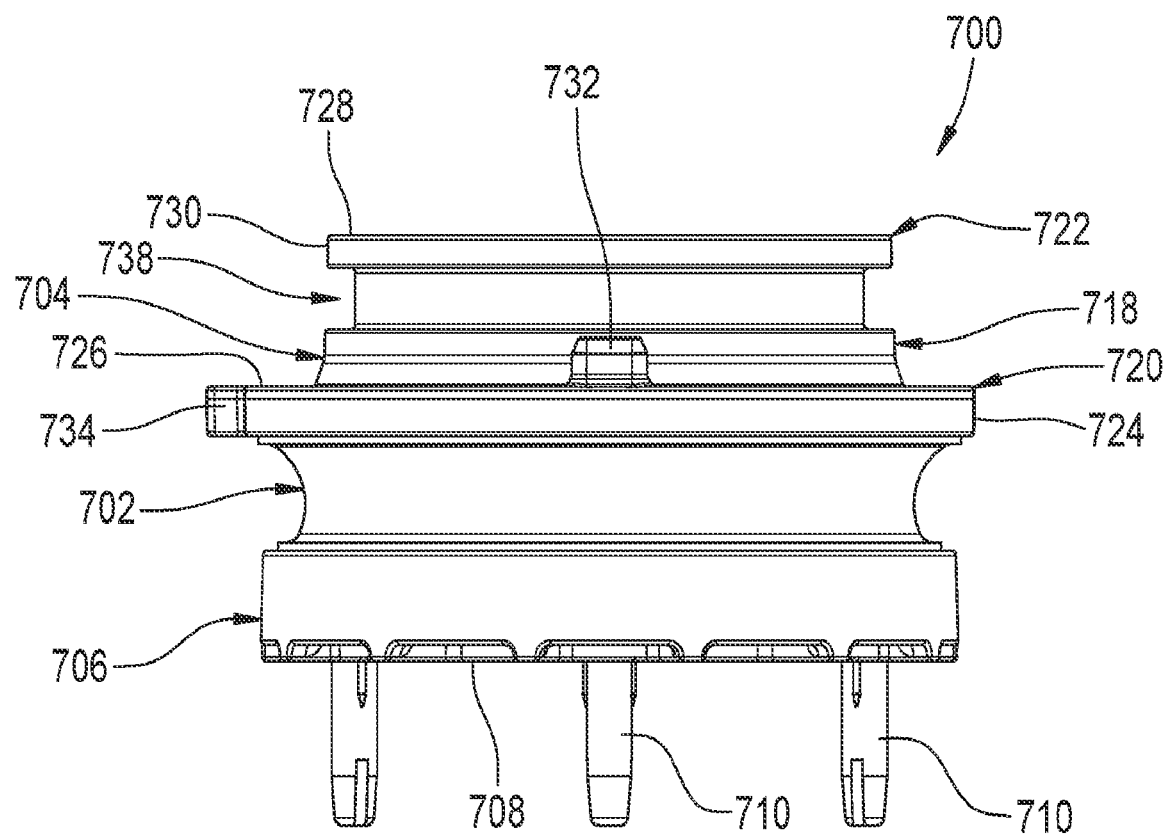
FIG. 19 is a side elevation view of the torsional isolator in FIGS. 2-9 and 16-18.

It will be appreciated that passages 602 can be of any suitable size, shape and/or configuration. However, in accordance with the subject matter of the present disclosure, passages 602 are shown and described herein as having a passage profile in plan view that is formed by an outer peripheral passage surface 662 extending axially through end wall portion 652. The passage peripheral profile has a side profile portion 662A and a side profile portion 662B spaced apart from side profile portion 662A in a peripheral direction. The passage profile can also include an inner profile portion 662C disposed toward inner side wall portion 650 and an outer profile portion 662D disposed toward outer side wall portion 656 with the inner and outer side profile portions operatively connecting side profile portions 662A and 662B to at least partially define passages 602. Rib portions 664 of end wall portion 652 can extend inwardly from alongside profile portion 662A, from alongside profile portion 662B, and/or from along both side profile portions 662A and 662B. As such, it will be appreciated that a maximum peripheral dimension of passages 602 can be defined between side profile portions 662A and 662B, such as is represented in FIG. 15 by reference dimension MPD, for example. Additionally, the inclusion of side profile portion 662A, side profile portion 662B or both side profile portions 662A and 662B can result in passages 602 having a rib distance between an innermost extent 664E of one of ribs 664 and an opposing one of side profile portions 662A and/or 662B, such as is represented in FIG. 15 by reference dimension RBD. Additionally, or in the alternative, the rib distance can be defined between innermost extents 664E of two ribs 664, such as is represented in FIG. 15 by reference dimension RBD'. In either case, rib distance RBD and/or RBD' is less than maximum peripheral dimension MPD. In such an arrangement, a transition or interference fit between passages 602 and projections 732 can be provided.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member supportable along an associated damper housing and dimensioned for securement to an associated flexible spring member, said end member having a longitudinal axis and comprising:
   a wall extending peripherally about said longitudinal axis and longitudinally between a first end and a second end opposite said first end, said wall including:
      a first wall portion disposed along said first end and including an outer surface portion dimensioned to receivingly engage the associated flexible spring member;
      a second wall portion disposed toward said second end in longitudinally-spaced relation to said first wall portion, said second wall portion including an inner surface portion dimensioned to receivingly engage an associated torsional isolator supported on the associated damper housing; and,
      a third wall portion disposed along an opposing side of said second wall portion from said first wall portion, said third wall portion extending radially outward beyond said second wall portion and including a passage surface at least partially defining a passage extending axially through said third wall portion in offset relation to said longitudinal axis with said passage dimensioned to at least partially receive an associated projection of the associated torsional isolator.

2. An end member according to claim 1, wherein said passage surface has a passage peripheral profile in plan view with a first side profile portion and a second side profile portion disposed in peripherally-spaced relation to said first side profile portion.

3. An end member according to claim 2, wherein said third wall portion includes a first rib portion extending into said passage from along said first side profile portion of said passage surface.

4. An end member according to claim 3, wherein said third wall portion includes a second rib portion extending into said passage from along said second side profile portion of said passage surface.

5. An end member according claim 2, wherein said passage profile defines a maximum peripheral dimension of said passage between said first and second profile portions, and said first rib portion includes an inward extent spaced from said second side profile portion by a rib distance that is less than said maximum peripheral dimension.

6. An end member according to claim 5, wherein said second rib portion includes an inward extent and said rib distance extends from said inward extent of said first rib portion to said inward extent of said second rib portion.

7. An end member according to claim 2, wherein said passage peripheral profile includes an inner profile portion and an outer profile portion disposed outward of said inner profile portion with said inner and outer profile portions extending between and interconnecting said first and second side profile portions.

8. An end member according to claim 1, wherein said passage is one of a plurality of passages extending axially through said third wall portion in offset relation to said longitudinal axis with said plurality of passages disposed in peripherally-spaced relation to one another about said longitudinal axis.

9. An end member according to claim 1, wherein said wall includes a fourth wall portion extending axially from along said third wall portion in a direction away from said first wall portion toward a distal edge with said fourth wall portion disposed radially outward of said second wall portion.

10. An end member according to claim 9, wherein said fourth wall portion includes a slot extending axially from an open end disposed toward said distal edge in a direction toward said third wall portion with said slot dimensioned to receivingly engage an associated indexing projection of the associated torsional isolator.

11. An end member assembly comprising:
   an end member according to claim 1, said end member at least partially formed from a first material; and,
   a backing ring separate from said end member and disposed along said first wall portion radially inward of said outer surface portion, said backing ring including a backing ring wall formed from a second material that is different from said first material of end member.

12. An end member assembly according to claim 11 further comprising an end member shell secured along an exterior surface portion of said end member, said end member shell including a shell wall having an outer surface along which the associated flexible spring member can at least partially form an associated rolling lobe.

13. An end member assembly according to claim 11 further comprising a torsional isolator supportable along the associated damper housing with said torsional isolator including:
   a first rigid body securable along the associated damper housing in rotationally-fixed relation thereto;
   a second rigid body operatively engaged in rotationally-fixed relation with said end member at least along said third wall portion thereof; and,
   a compliant body operatively connected between said first and second rigid bodies.

14. An end member assembly comprising:
   an end member according to claim 1, said end member at least partially formed from a first material; and,
   an end member shell secured along an exterior surface of said end member between said first and fourth wall portions, said end member shell including a shell wall having an outer surface along which the associated flexible spring member can at least partially form an associated rolling lobe.

15. An end member assembly according comprising:
   an end member according to claim 1, said end member at least partially formed from a first material; and,
   a torsional isolator supportable along the associated damper housing with said torsional isolator including:
      a first rigid body securable along the associated damper housing in rotationally-fixed relation thereto;
      a second rigid body operatively engaged in rotationally-fixed relation with said end member at least along said third wall portion thereof; and,
      a compliant body operatively connected between said first and second rigid bodies.

16. A gas spring and damper assembly comprising:
a damper assembly having a longitudinally-extending axis and including:
   a damper housing including a housing wall extending axially between opposing first and second ends, said housing wall at least partially defining a damping chamber containing a quantity of damping fluid; and,
   a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing ; and,
a gas spring assembly disposed in axially coextensive relation with at least a portion of said damper assembly, said gas spring assembly including:
   a flexible spring member extending peripherally about said longitudinal axis and longitudinally between opposing first and second ends such that a spring chamber is at least partially defined therebetween;
   a first end member operatively connected to said elongated damper rod and/or operatively secured across said first end of said flexible spring member such that a substantially fluid-tight connection is formed therebetween; and,
   a second end member according to claim 1 supported on said damper housing and operatively secured across said second end of said flexible spring member such that a substantially fluid-tight connection is formed therebetween.

17. A suspension system comprising:
a pressurized gas system including a pressurized gas source and a control device; and,
at least one gas spring and damper assembly according to claim 16 disposed in fluid communication with said pressurized gas source through said control device such that pressurized gas can be selectively transferred into and out of at least said spring chamber.

18. A gas spring and damper assembly comprising:
a damper assembly having a longitudinally-extending axis and including:
   a damper housing including a housing wall extending axially between opposing first and second ends, said housing wall at least partially defining a damping chamber containing a quantity of damping fluid; and,
   a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing; and,
a gas spring assembly disposed in axially coextensive relation with at least a portion of said damper assembly, said gas spring assembly including:
   a flexible spring member extending peripherally about said longitudinal axis and longitudinally between opposing first and second ends such that a spring chamber is at least partially defined therebetween;
   a first end member operatively connected to said elongated damper rod and/or operatively secured across said first end of said flexible spring member such that a substantially fluid-tight connection is formed therebetween; and,
   an end member assembly including a second end member and a backing ring:
      said second end member supported on said damper housing and operatively secured across said second end of said flexible spring member such that a substantially fluid-tight connection is formed therebetween, said second end member at least partially formed from a first material and including a second end member wall extending peripherally about said longitudinal axis and longitudinally between a first end member end and a second end member end opposite said first end member end, said second end member wall including:
         a first wall portion disposed along said first end member end and including an outer surface portion dimensioned to receivingly engage said flexible spring member;
         a second wall portion disposed toward said second end member end in longitudinally-spaced relation to said first wall portion, said second wall portion including an inner surface portion dimensioned to receivingly engage an associated torsional isolator supported on said damper housing; and,
         a third wall portion disposed along an opposing side of said second wall portion from said first wall portion, said third wall portion extending radially outward beyond said second wall portion and including a passage surface at least partially defining a passage extending axially through said third wall portion in offset relation to said longitudinal axis with said passage dimensioned to at least partially receive an associated projection of the associated torsional isolator; and,
      said backing ring separate from said second end member and disposed along said first wall portion radially inward of said outer surface portion, said backing ring including a backing ring wall formed from a second material that is different from said first material of end member.

19. A gas spring and damper assembly according to claim 18, wherein said end member assembly includes an end member shell secured along an exterior surface portion of said second end member, said end member shell including a shell wall having an outer surface along which said flexible spring member can at least partially form a rolling lobe.

20. A gas spring and damper assembly according to claim 18 further comprising a torsional isolator supportable along said damper housing with said torsional isolator including:
a first rigid body securable along said damper housing in rotationally-fixed relation thereto;
a second rigid body operatively engaged in rotationally-fixed relation with said second end member at least along said third wall portion thereof; and,
a compliant body operatively connected between said first and second rigid bodies.

* * * * *